United States Patent
Choi et al.

(10) Patent No.: US 11,700,096 B2
(45) Date of Patent: **\*Jul. 11, 2023**

(54) METHOD FOR TRANSMITTING AND RECEIVING SRS AND COMMUNICATION DEVICE THEREFOR

(71) Applicant: LG Electronics Inc., Seoul (KR)

(72) Inventors: Kukheon Choi, Seoul (KR); Jiwon Kang, Seoul (KR); Jonghyun Park, Seoul (KR); Kyuseok Kim, Seoul (KR); Kilborn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 147 days.

This patent is subject to a terminal disclaimer.

(21) Appl. No.: 17/235,332

(22) Filed: Apr. 20, 2021

(65) Prior Publication Data

US 2021/0250145 A1  Aug. 12, 2021

Related U.S. Application Data

(63) Continuation of application No. 16/843,407, filed on Apr. 8, 2020, now Pat. No. 10,999,032, which is a (Continued)

(51) Int. Cl.
*H04L 12/28* (2006.01)
*H04L 5/00* (2006.01)
(Continued)

(52) U.S. Cl.
CPC ........... *H04L 5/0048* (2013.01); *H04B 1/713* (2013.01); *H04W 72/0446* (2013.01)

(58) Field of Classification Search
CPC ..... H04B 1/713; H04B 1/7143; H04L 5/0012; H04L 25/0224; H04L 25/0226; H04L 27/26132; H04W 72/0446; H04W 72/0453
(Continued)

(56) References Cited

U.S. PATENT DOCUMENTS

2012/0300740 A1  11/2012 Iwai et al.
2018/0206132 A1*  7/2018 Guo ................... H04B 7/0404
(Continued)

FOREIGN PATENT DOCUMENTS

CN  102017455  4/2011
CN  106059737  10/2016
(Continued)

OTHER PUBLICATIONS

Office Action in Chinese Appln. No. 201880079842.7, dated Aug. 5, 2022, 10 pages (with English translation).
(Continued)

*Primary Examiner* — John Pezzlo
(74) *Attorney, Agent, or Firm* — Fish & Richardson P.C.

(57) ABSTRACT

A method for transmitting a sounding reference signal (SRS) by a by a user equipment (UE) includes: receiving, from a base station, first information on a number of SRS symbols configured for one slot and second information on a number of repetitions of symbols configured for transmission of an SRS; determining whether the number of repetitions is greater than the number of the SRS symbols; when the number of repetitions is greater than the number of the SRS symbols, determining the number of repetitions of the symbols by a value identical to the number of the SRS symbols; and transmitting the SRS based on the determined number of repetitions. The UE is capable of communicating with at least one of another UE, a UE related to an autonomous driving vehicle, a base station, or a network.

15 Claims, 33 Drawing Sheets

Related U.S. Application Data continuation of application No. PCT/KR2018/011890, filed on Oct. 10, 2018.

(60) Provisional application No. 62/571,167, filed on Oct. 11, 2017.

(51) Int. Cl.
*H04B 1/713* (2011.01)
*H04W 72/0446* (2023.01)
*H04J 1/16* (2006.01)

(58) Field of Classification Search
USPC .................................. 370/252, 329, 430, 442
See application file for complete search history.

(56) References Cited

U.S. PATENT DOCUMENTS

| | | | |
|---|---|---|---|
| 2018/0248675 A1* | 8/2018 | Bhattad | ............... H04L 5/14 |
| 2019/0098654 A1 | 3/2019 | Li et al. | |
| 2019/0109732 A1 | 4/2019 | Choi et al. | |
| 2019/0140793 A1 | 5/2019 | Takeda et al. | |
| 2019/0190669 A1 | 6/2019 | Park et al. | |
| 2019/0199555 A1* | 6/2019 | Munier | ............... H04L 5/0051 |

FOREIGN PATENT DOCUMENTS

| | | |
|---|---|---|
| EP | 2023503 | 2/2009 |
| WO | WO2015012666 | 1/2015 |
| WO | WO2016122274 | 8/2016 |

OTHER PUBLICATIONS

EP Extended European Search Report in European Appln. No. 18866956.8, dated Jun. 1, 2021, 10 pages.
IN Office Action in Indian Appln. No. 202027016686, dated May 31, 2021, 5 pages (with English translation).
NTT Docomo, Inc., "New Radio (NR) Access Technology," RP-171783, 3GPP TSG RAN meeting #77, Sapporo, Japan, dated Sep. 11-14, 2017, 283 pages.
ZTE, Sanechips, "Details of UL beam management," R1-1717430, 3GPP TSG RAN WG1 Meeting 90bis, Prague, CZ, dated Oct. 9-13, 2017, 6 pages.
Ericsson, "Details on SRS design," R1-1718450, 3GPP TSG-RAN WG1 #90bis, Prague, Czech Republic, dated Oct. 9-13, 2017, 11 pages.
LG Electronics, "On SRS design," R1-1719914, 3GPP TSG RAN WG1 Meeting NR #91, Reno, USA, dated Dec. 27-1, 2017, 3 pages.
Office Action in Japanese Appln. No. 2020-520569, dated Jul. 27, 2021, 5 pages (with English translation).
ZTE, Sanechips, "Discussion on SRS design for NR," R1-1717435, 3GPP TSG RAN WG1 Meeting 90bis, Prague, CZ, dated Oct. 9-13, 2017, 9 pages.
Ericsson, "Details on SRS design," R1-1716374, 3GPP TSG-RAN WG1 NR Ad Hoc #3, Nagoya, Japan, dated Sep. 18-21, 2017, 7 pages.
Huawei, HiSilicon, "UL SRS design for beam management and CSI acquisition," R1-1712238, 3GPP TSG RAN WG1 Meeting #90, Prague, Czech Republic, dated Aug. 21-25, 2017, 12 pages.
PCT International Search Report and Written Opinion in International Appln. No. PCT/KR2018/011890, dated Jan. 16, 2019, 21 pages (with English translation).
Qualcomm Incorporated, "Discussion on SRS Design," R1-1713412, 3GPP TSG RAN WG1 Meeting #90, Prague, Czech Republic, dated Aug. 21-25, 2017, 7 pages.
Spreadtrum Communications, "Support of long-PUCCH transmission over multiple slots," R1-1715514, 3GPP TSG RAN WG1 Meeting NR#3, Nagoya, Japan, dated Sep. 18-21, 2017, 4 pages.
ZTE, Sanechips, "Discussion on SRS design for NR," R1-1715451, 3GPP TSG RAN WG1 Meeting NR#3, Nagoya, Japan, dated Sep. 18-21, 2017, 7 pages.

\* cited by examiner

FIG. 8A
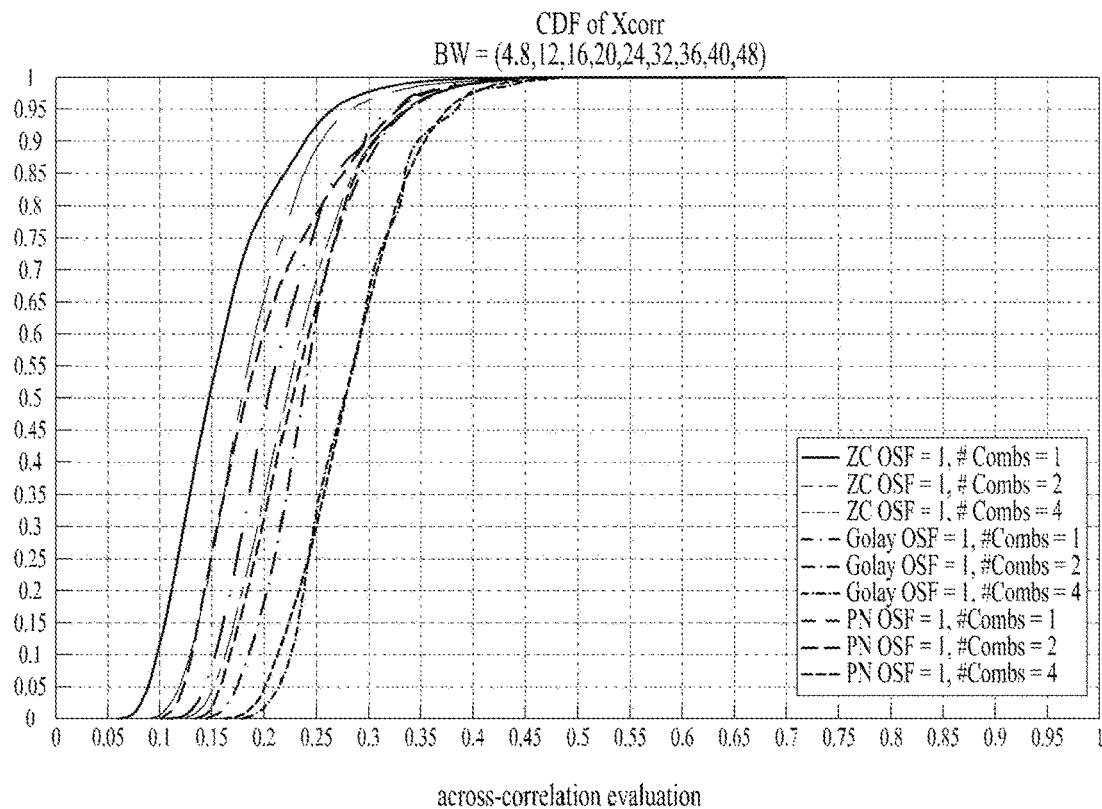
across-correlation evaluation
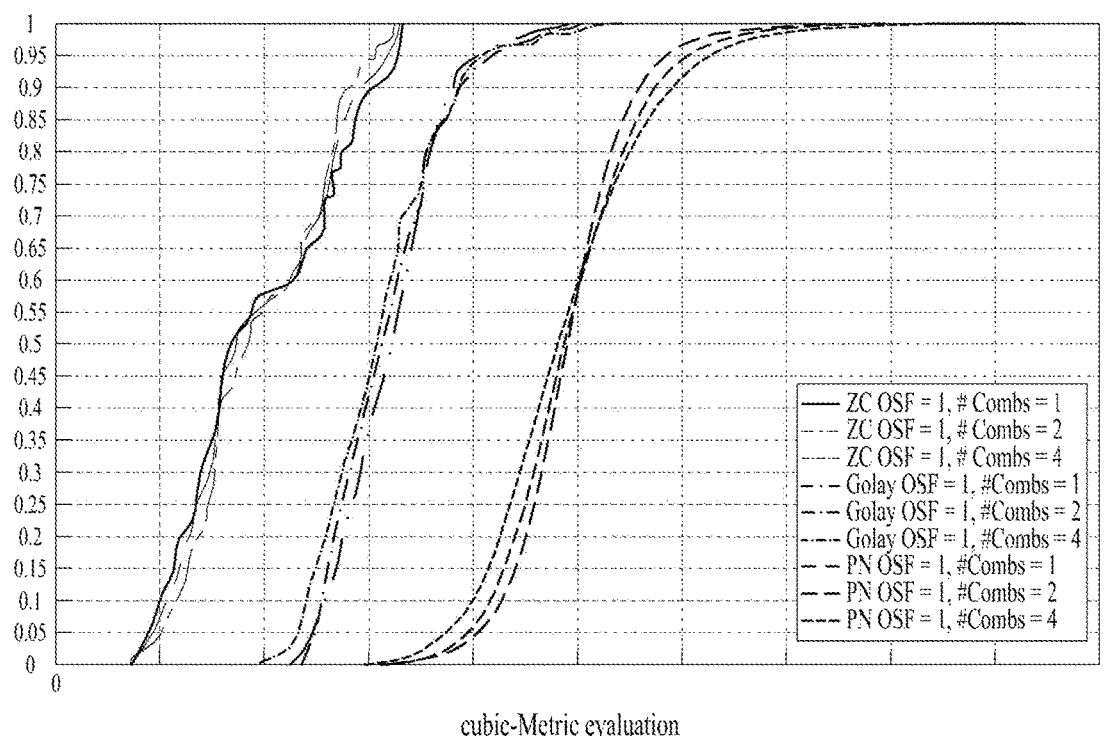
cubic-Metric evaluation
FIG. 8B fixed symbol-level hopping pattern another fixed symbol-level hopping pattern

METHOD FOR TRANSMITTING AND RECEIVING SRS AND COMMUNICATION DEVICE THEREFOR

CROSS-REFERENCE TO RELATED APPLICATIONS

This application is a continuation of U.S. application Ser. No. 16/843,407, filed on Apr. 8, 2020, which is a continuation of International Application No. PCT/KR2018/011890, filed on Oct. 10, 2018, which claims the benefit of U.S. Provisional Application No. 62/571,167, filed on Oct. 11, 2017. The disclosures of the prior applications are incorporated by reference in their entirety.

TECHNICAL FIELD

The present disclosure relates to wireless communication and, more particularly, to a method of transmitting and receiving a sounding reference signal (SRS) and a communication apparatus therefor.

BACKGROUND

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

SUMMARY

An object of the present disclosure is to provide a method of transmitting a sounding reference signal (SRS) by a user equipment (UE).

Another object of the present disclosure is to provide a method of receiving an SRS by a base station (BS).

Another object of the present disclosure is to provide a UE for transmitting an SRS.

Another object of the present disclosure is to provide a BS for receiving an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, provided herein is a method of transmitting a sounding reference signal (SRS) by a user equipment (UE), including receiving first information on the number of SRS symbols configured in one slot and second information on the repetition number of symbols configured for SRS transmission from a base station (BS); determining whether the repetition number of symbols configured for SRS transmission is greater than the number of SRS symbols configured in the one slot; determining the repetition number of symbols configured for SRS transmission as a value equal to the number of SRS symbols configured in the one slot, based on the repetition number of symbols configured for SRS transmission greater than the number of SRS symbols configured in the one slot; and transmitting the SRS based on the determined repetition number of symbols configured for SRS transmission.

The method may further include receiving information on a first parameter value indicating SRS bandwidth and information on a second parameter value indicating SRS frequency hopping bandwidth from the BS. The SRS may be transmitted by being hopped at a slot level based on the first parameter value greater than the second parameter value.

The determined repetition number of symbols configured for SRS transmission may be a repetition number over at least two slots, and the SRS may be transmitted over the at least two slots. The determined repetition number of symbols configured for SRS transmission may be a repetition number over the one slot, and the SRS is transmitted over the one slot without frequency hopping.

The first information and the second information may be received through radio resource control (RRC) signaling.

In another aspect of the present disclosure, provided herein is a method of receiving a sounding reference signal (SRS) by a base station (BS), including transmitting first information on the number of SRS symbols configured in one slot and second information on the repetition number of symbols configured for SRS transmission to a user equipment (UE); determining the repetition number of symbols configured for SRS transmission as a value equal to the number of SRS symbols configured in the one slot, based on the repetition number of symbols configured for SRS transmission greater than the number of SRS symbols configured in the one slot; and receiving the SRS based on the determined repetition number of symbols configured for SRS transmission.

The method may further include transmitting information on a first parameter value indicating SRS bandwidth and information on a second parameter value indicating SRS frequency hopping bandwidth to the UE. The SRS may be received by being hopped at a slot level based on the first parameter value greater than the second parameter value.

The determined repetition number of symbols configured for SRS transmission may be a repetition number over at least two slots, and the SRS may be received over the at least two slots. The determined repetition number of symbols configured for SRS transmission may be a repetition number over the one slot, and the SRS may be received over the one slot without frequency hopping. The first information and the second information may be transmitted through radio resource control (RRC) signaling.

In another aspect of the present disclosure, provided herein is a user equipment (UE) for transmitting a sounding reference signal (SRS), including a receiver configured to receive first information on the number of SRS symbols configured in one slot and second information on the repetition number of symbols configured for SRS transmission from a base station (BS); a processor configured to determine whether the repetition number of symbols configured for SRS transmission is greater than the number of SRS symbols configured in the one slot, and determine the repetition number of symbols configured for SRS transmission as a value equal to the number of SRS symbols configured in the one slot, based on the repetition number of symbols configured for SRS transmission greater than the number of SRS symbols configured in the one slot; and a transmitter configured to transmit the SRS based on the determined repetition number of symbols configured for SRS transmission.

The receiver may receive information on a first parameter value indicating SRS bandwidth and information on a second parameter value indicating SRS frequency hopping bandwidth from the BS. The processor may control the transmitter to transmit the SRS by being hopped at a slot level based on the first parameter value greater than the second parameter value. The receiver may receive the first information and the second information through radio resource control (RRC) signaling.

In another aspect of the present disclosure, provided herein is base station (BS) for receiving a sounding reference signal (SRS), including a transmitter configured to transmit first information on the number of SRS symbols configured in one slot and second information on the repetition number of symbols configured for SRS transmission to a user equipment (UE); a processor configured to determine the repetition number of symbols configured for SRS transmission as a value equal to the number of SRS symbols configured in the one slot, based on the repetition number of symbols configured for SRS transmission greater than the number of SRS symbols configured in the one slot; and a receiver configured to receive the SRS based on the determined repetition number of symbols configured for SRS transmission. The transmitter may transmit information on a first parameter value indicating SRS bandwidth and information on a second parameter value indicating SRS frequency hopping bandwidth to the UE, and the processor may control the receiver to receive the SRS by being hopped at a slot level based on the first parameter value greater than the second parameter value.

According to an embodiment of the present disclosure, a UE and a BS may efficiently perform sounding reference signal (SRS) transmission (inter-slot hopping may be performed) and reception without errors even when $r>N_{symbol}$.

The effects that can be achieved with the present disclosure are not limited to what has been particularly described hereinabove and other advantages not described herein will be more clearly understood by persons skilled in the art from the following detailed description of the present disclosure.

BRIEF DESCRIPTION OF THE DRAWINGS

The accompanying drawings, which are included to provide a further understanding of the disclosure, illustrate embodiments of the disclosure and together with the description serve to explain the principle of the disclosure.

FIGS. 8A and 8B are diagrams illustrating cross-correlation and cubic-metric evaluations of ZC, Golay, and PN sequences;

DETAILED DESCRIPTION

Figure 1:
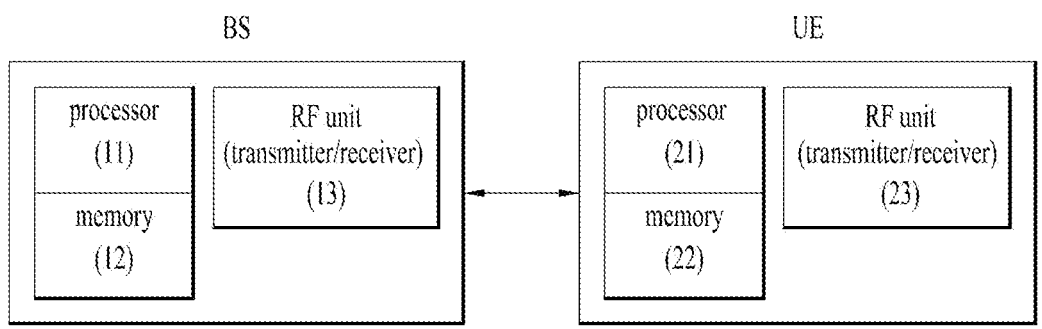
FIG. 1 is a diagram illustrating a wireless communication system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On downlink (DL), a transmitter may be a part of the BS and a receiver may be a part of the UEs 20. On uplink (UL), the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (8×8) antenna elements may be installed in a 4*4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 2A:
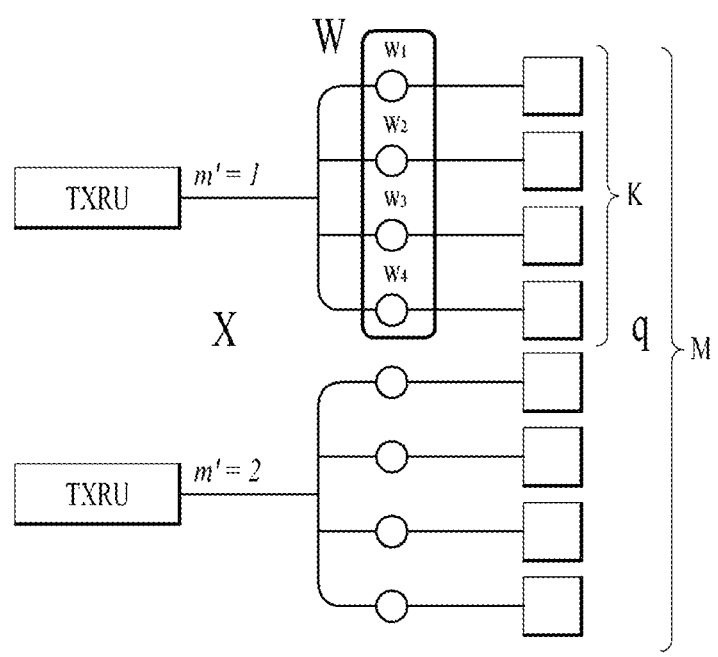
FIG. 2A is a diagram illustrating TXRU virtualization model option 1 (sub-array model) and FIG. 2B is a diagram illustrating TXRU virtualization model option 2 (full connection model).
Figure 2B:
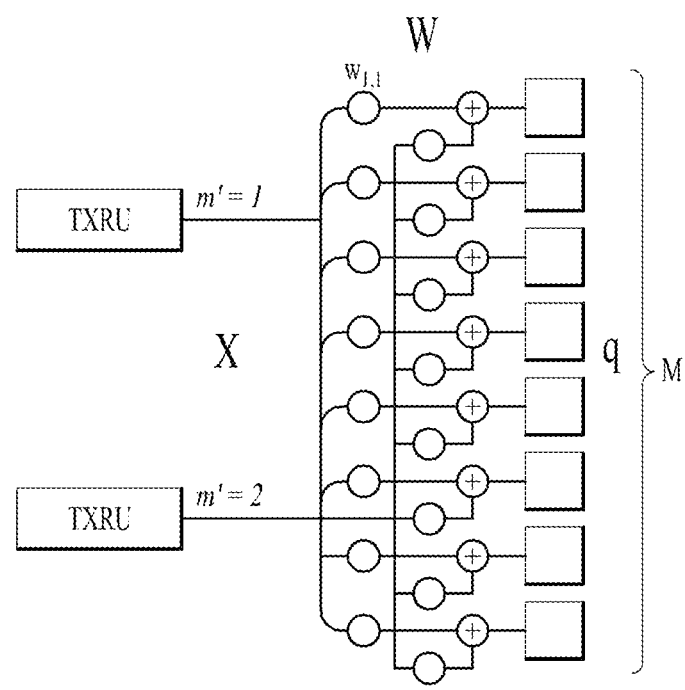

FIG. 2A is a diagram illustrating TXRU virtualization model option 1 (sub-array model) and FIG. 2B is a diagram illustrating TXRU virtualization model option 2 (full connection model).

FIGS. 2A and 2B show representative examples of a method of connecting TXRUs and antenna elements. Here, the TXRU virtualization model shows a relationship between TXRU output signals and antenna element output signals. FIG. 2A shows a method of connecting TXRUs to sub-arrays. In this case, one antenna element is connected to one TXRU. In contrast, FIG. 2B shows a method of connecting all TXRUs to all antenna elements. In this case, all antenna elements are connected to all TXRUs. In FIGS. 2A and 2B, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1-to-1 or 1-to-many.

Hybrid Beamforming

Figure 3:
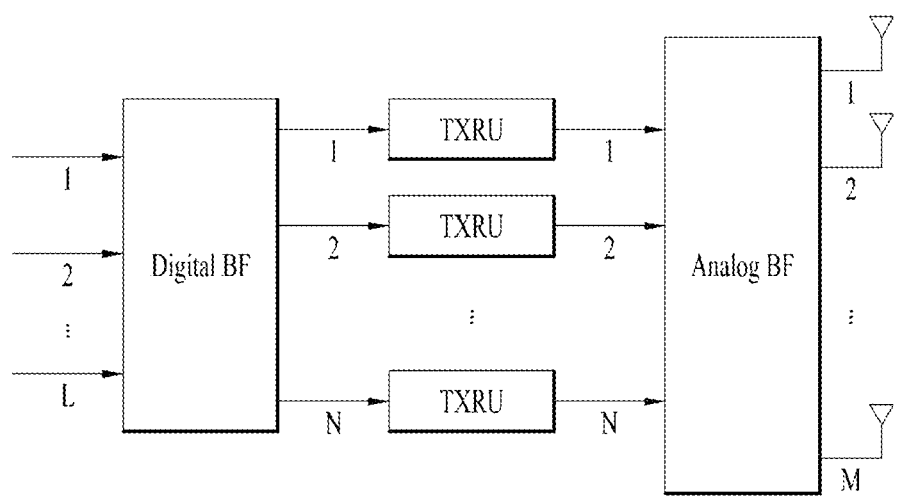
FIG. 3 is a block diagram for hybrid beamforming.

FIG. 3 is a block diagram for hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 3, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

Figure 4:
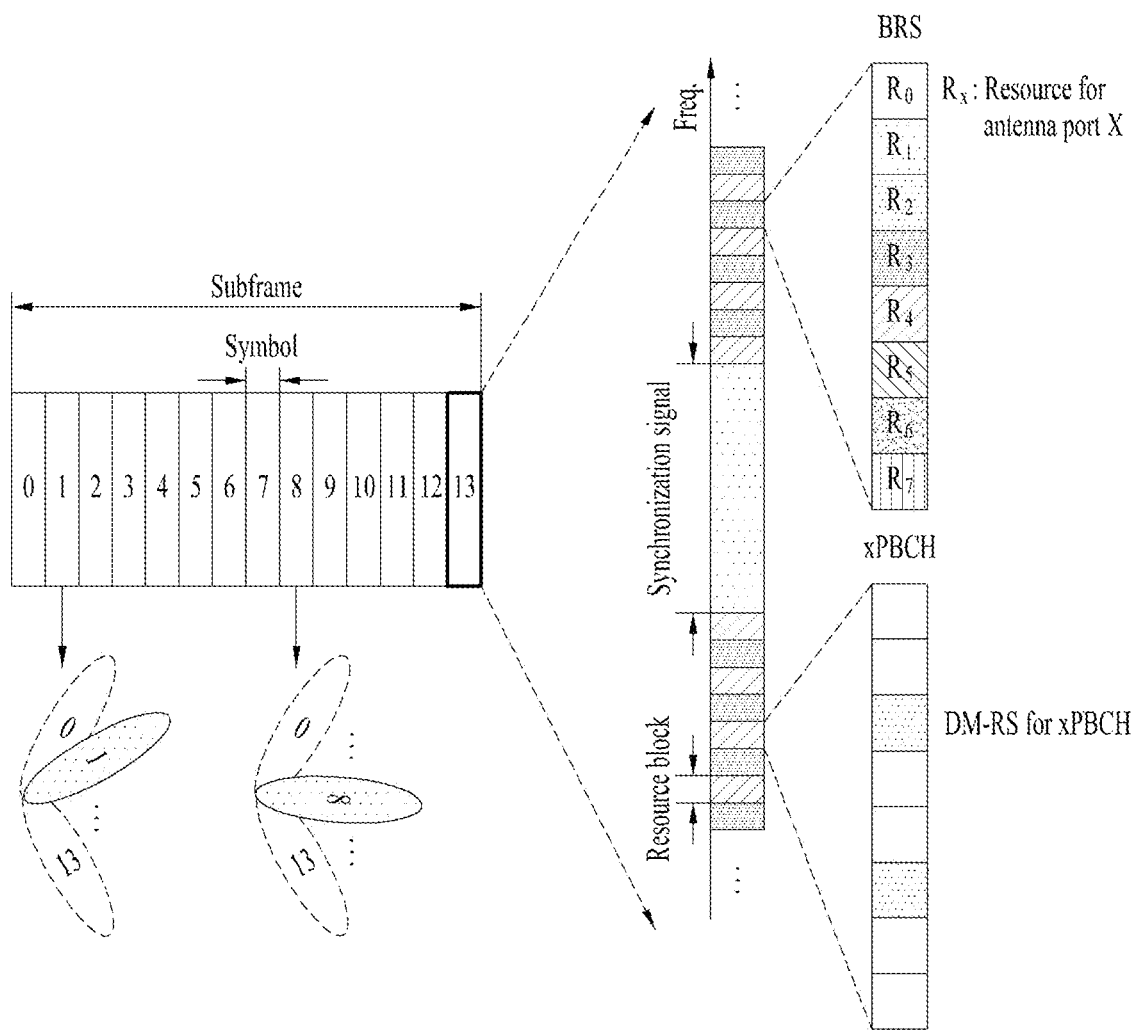
FIG. 4 is a diagram illustrating beams mapped to BRS symbols in hybrid beamforming.

FIG. 4 is a diagram illustrating beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
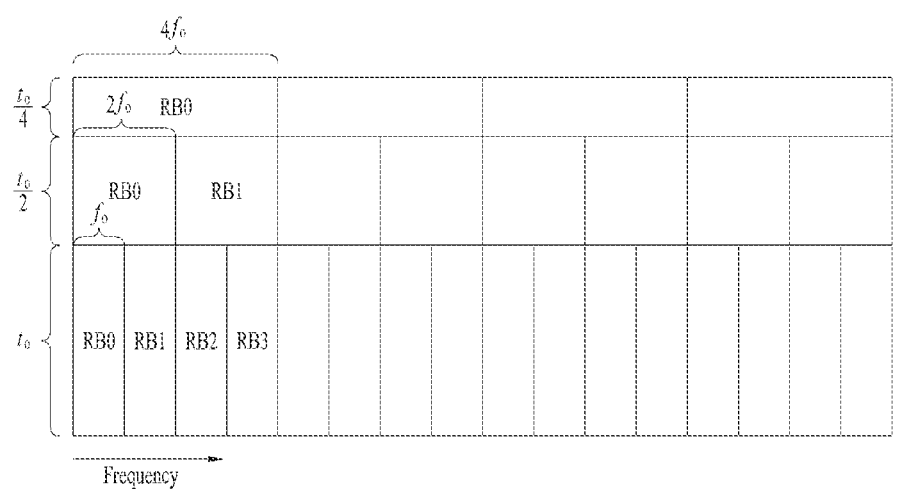
FIG. 5 is a diagram illustrating symbol/sub-symbol alignment between different numerologies.

FIG. 5 is a diagram illustrating symbol/sub-symbol alignment between different numerologies.

New RAT(NR) Numerology Characteristics

In NR, a method of supporting scalable numerology is being considered. That is, a subcarrier spacing of NR is (2n×15) kHz and n is an integer. From the nested viewpoint, a subset or a superset (at least 15, 30, 60, 120, 240, and 480 kHz) is being considered as a main subcarrier spacing. Symbol or sub-symbol alignment between different numerologies was supported by performing control to have the same CP overhead ratio.

In addition, the numerology is determined in a structure for dynamically allocating time/frequency granularity according to services (eMBB, URLLC and mMTC) and scenarios (high speed, etc.).

Bandwidth Dependent/Non-Dependent Sequence for Orthogonalization

In an LTE system, an SRS is differently designed according to sounding bandwidth. That is, a computer-generated sequence is used when a sequence having length 24 or less is designed and a Zadoff-Chu (ZC) sequence is used in the case of a sequence of length 36 (3 RBs) or more. The greatest advantages of the ZC sequence are that the ZC sequence has low peak-to-average power ratio (PAPR) or low cubic metric and simultaneously has ideal autocorrelation and low cross-correlation properties. However, in order to satisfy such properties, the lengths (indicating sounding bandwidth) of necessary sequences should be the same. Accordingly, in order to support UEs having different sounding bandwidths, allocation to different resource regions is necessary. In order to minimize channel estimation performance deterioration, interleaved frequency division multiple access (IFDMA) comb structures have different sounding bandwidths to support orthogonality of UEs for performing simultaneous transmission. If such a transmission comb (TC) structure is used in a UE having a small sounding bandwidth, a sequence length may become less than a minimum sequence length (generally, a length of 24) having orthogonality and thus TC is limited to 2. If the same TC is used in the same sounding resource, a dimension for providing orthogonality is necessary, thereby leading to use of CDM using cyclic shift.

Meanwhile, there are sequences which have PAPR and correlation performances slightly lower than those of ZC sequences but are capable of being subjected to resource mapping regardless of sounding bandwidth, such as a Golay sequence and a pseudo random (PN) sequence. In the case of the Golay sequence, when the autocorrelation values of certain sequences a and b are $A_a$ and $A_b$, a and b, the sum of the autocorrelation values of which satisfies the following condition, are referred to as a Golay complementary sequence pair $(A_a+A_b=\delta(x))$.

Figure 6:
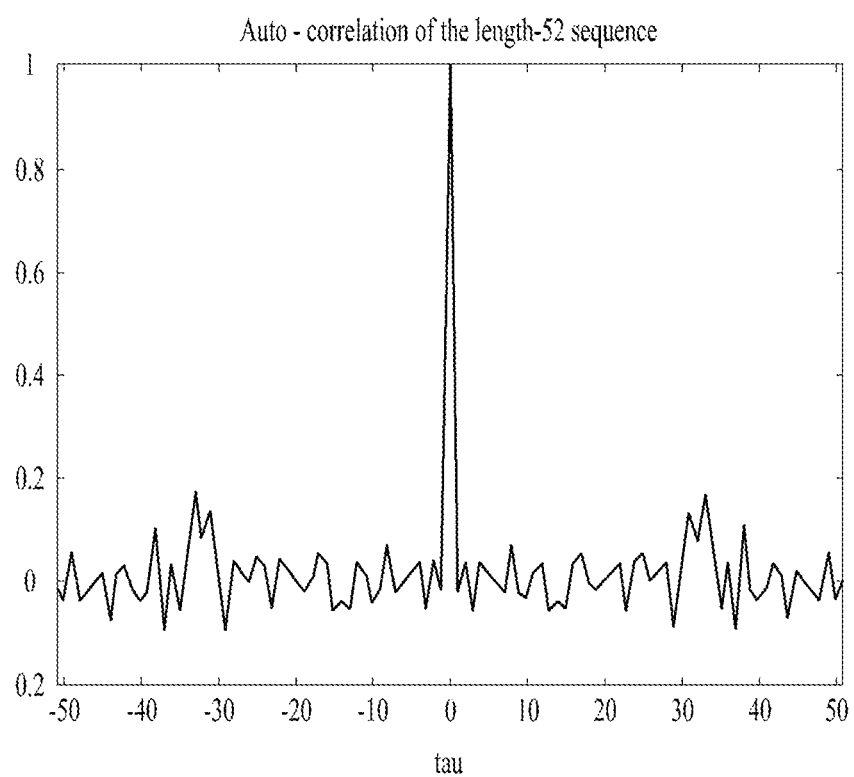
FIG. 6 is a diagram illustrating performance of 52-length autocorrelation using two 26-length Golay complementary sequence pairs.

For example, when length-26 Golay sequences a and b are a=[1 −1 1 1 −1 −1 1 −1 −1 −1 −1 1 1 −1 1 1 −1 −1 −1 1 1 1 −1 −1 1 1 −1 1 1] and b=[−1 1 −1−1 1 1 1 −1 1 1 1 1 −1−1 1 −1−1 −1−1 1 −1 1 1 1 −1 −1 −1 1 −1 1 1], the two sequences are concatenated to configure a 52-length sequence. In addition, when 0 is mapped to four resource elements (REs) of both sides, auto-correlation performance shown in FIG. 7 may be obtained. FIG. 6 is a diagram illustrating performance of 52-length autocorrelation using two 26-length Golay complementary sequence pairs.

Figure 7:
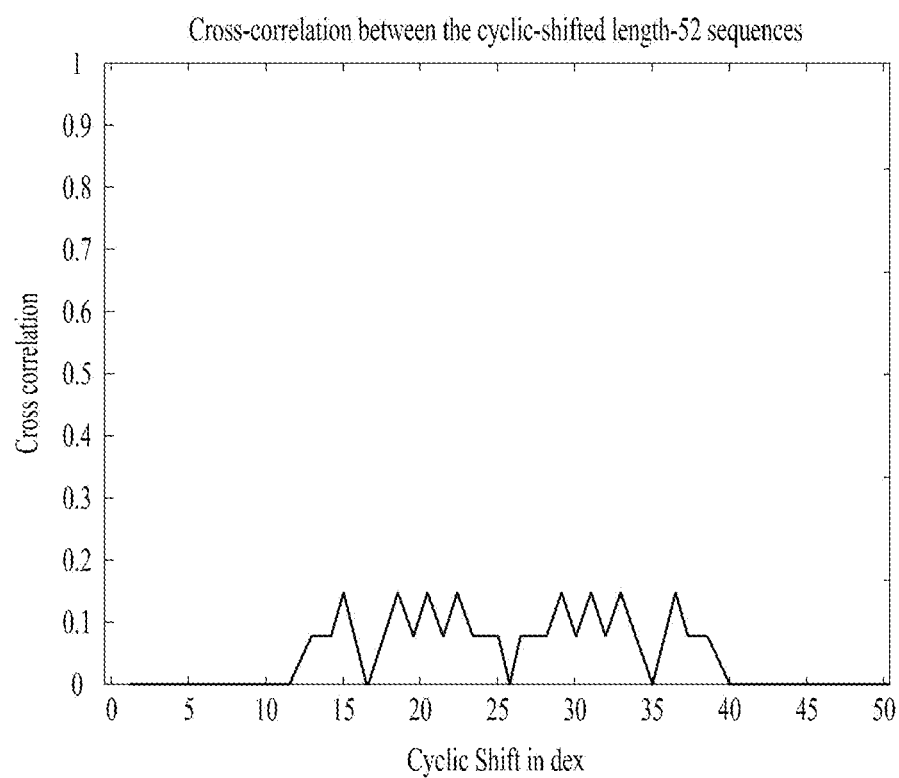
FIG. 7 is a diagram illustrating cross-correlation between sequences having different CSs in a 52-length Golay sequence.

FIG. 7 is a diagram illustrating cross-correlation between sequences having different CSs in a 52-length Golay sequence.

A plurality of cyclic shifts (CSs) may be applied to the 52-length sequences to generate a plurality of Golay sequences. Cross-correlation between Golay sequences having different CSs is shown in FIGS. 8A and 8B.

FIGS. 8A and 8B are diagrams illustrating cross-correlation and cubic-metric evaluations of ZC, Golay, and PN sequences.

The cubic metrics (CMs) and cross-correlations of the ZC, Golay, and PN sequences are calculated and compared when TC is 1, 2 or 4. Assumptions for evaluation are as follows.

The sounding BW is set to 4, 8, 12, 16, 20, 24, 32, 36, and 48 RBs (based on LTE SRS design).

Like the LTE system, 30-group number u=$(f_{gh}(n_s)+f_{ss})$ mod30 is determined as follows and $(f_{gh}(n_s),f_{ss})$ is determined based on a cell ID. In this case, one base sequence v is selected in 4 RBs and two base sequence numbers v are selected in the others.

In the case of the Golay sequence, a 2048-length truncated binary Golay sequence in an 802.16m system was used and a QPSK PN sequence was used as an independent bandwidth SRS design example. In this case, in order to represent 30 groups in the ZC sequence, the Golay sequence was generated using 30 CSs and 30 PN sequences were generated in Matlab.

Evaluation was performed using TC=1, 2, and 4.

In cubic metric evaluation, an oversampling factor (OSF) was set to 8 for better resolution.

Referring to FIG. 8A, cross correlation performance was in order of ZC>Golay>PN sequence, and CM performance was in order of ZC>Golay>PN. In order to generate an SRS sequence for UL transmission, the ZC sequence has good performance as in the LTE system. However, in order to increase a degree of freedom in allocation of sounding bandwidth to each UE, the Golay sequence or the PN sequence may not be excluded as SRS sequence candidates of New RAT.

SRS hopping characteristics in the LTE system are as follows.

SRS hopping operation is performed only at the time of periodic SRS triggering (triggering type 0).

Allocation of SRS resources is given in a predefined hopping pattern.

A hopping pattern may be configured through RRC signaling in a UE-specific manner (however, overlapping is not allowed).

The SRSs may be frequency-hopped and transmitted using a hopping pattern for each subframe in which a cell/UE-specific SRS is transmitted.

The SRS frequency-domain start position and hopping equation are analyzed through Equation 1 below.

$$k_0^{(p)} = \bar{k}_0^{(p)} + \sum_{b=0}^{B_{SRS}} {}'K_{TC}M_{sc,b}^{RS}n_b$$

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}$$

-continued $$F_b(n_{SRS}) = \begin{cases} (N_b/2) \left[ \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor \right] & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

$$n_{SRS} = \begin{cases} 2N_{SP} n_f + 2(N_{SP} - 1) \left\lfloor \dfrac{n_s}{10} \right\rfloor + \left\lfloor \dfrac{T_{offset}}{T_{offset\_max}} \right\rfloor, \\ \lfloor n_f \times 10 + \lfloor n_s/2 \rfloor \rfloor / T_{SRS} \end{cases}$$

where, $n_{SRS}$ denotes a hopping interval in the time domain, $N_b$ denotes the number of branches allocated to a tree level b, and b may be determined by setting $B_{SRS}$ in dedicated RRC.

Figure 9:
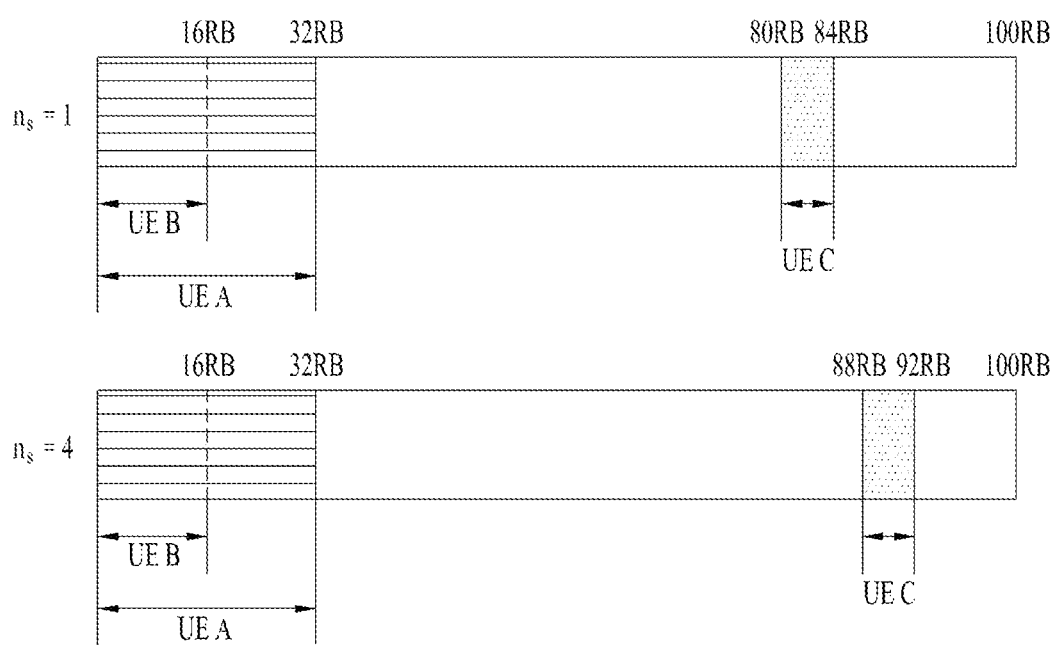
FIG. 9 is a diagram illustrating an LTE hopping pattern $(n_s=1 \rightarrow n_s=4)$.

FIG. 9 is a diagram illustrating an LTE hopping pattern ($n_s=1 \rightarrow n_s=4$).

An example of configuring an LTE hopping pattern will be described.

LTE hopping pattern parameters may be set through cell-specific RRC signaling. For example, $C_{SRS}=1$, $N_{RB}^{UL}=100$, $n_f=1$, $n_s=1$ may be set.

Next, LTE hopping pattern parameters may be set through UE-specific RRC signaling. For example, UE A: $B_{SRS}=1$, $b_{hop}=0$, $n_{RRC}=22$, $T_{SRS}=10$
UE B: $B_{SRS}=2$, $b_{hop}=0$, $n_{RRC}=10$, $T_{SRS}=5$
UE C: $B_{SRS}=3$, $b_{hop}=2$, $n_{RRC}=23$, $T_{SRS}=2$ Table 1 below shows agreements about SRS transmission resources in NR.

Table 1
A UE can be configured with an X-port SRS resource, where the SRS resource spans one or multiple OFDM symbols within a single slot
  FFS where all of the X SRS ports are sounded in each OFDM symbol
FFS at least for the purposes of CSI acquisition:
  FFS a multi-symbol SRS resource can be configured such that the X SRS Ports in each OFDM symbol are transmitted in different locations of the band in different OFDM symbols in the slot in a frequency hopping manner
    Note: This allows sounding a larger part of (or the full) UE bandwidth using narrower band SRS transmissions
    Note: at any OFDM symbol all X ports are sounded in the same portion of the band
    Note: Consider UE RF implementation aspects on SRS design that may place constraints on the design of the symbol-wise hopping pattern
  e.g., Required time for frequency re-tuning (if re-tuning needed) or transient period if re-tuning is not needed It has been approved that SRS frequency hopping should be supported in multiple SRS symbols configured in 3GPP RAN1 88 biz, and frequency hopping between slots in which SRS is configured should be supported. When one multi-symbol SRS is triggered, SRS configuration for full-band UL resource allocation may be necessary while a certain SRS resource hops. SRS configuration for full-band UL resource allocation also may be necessary for UL beam management. For example, when multiple SRSs are triggered for UL beam management of an NR UE, subband-wise UL beam management using the same Tx precoding of the NR UE may be necessary.

Figure 10:
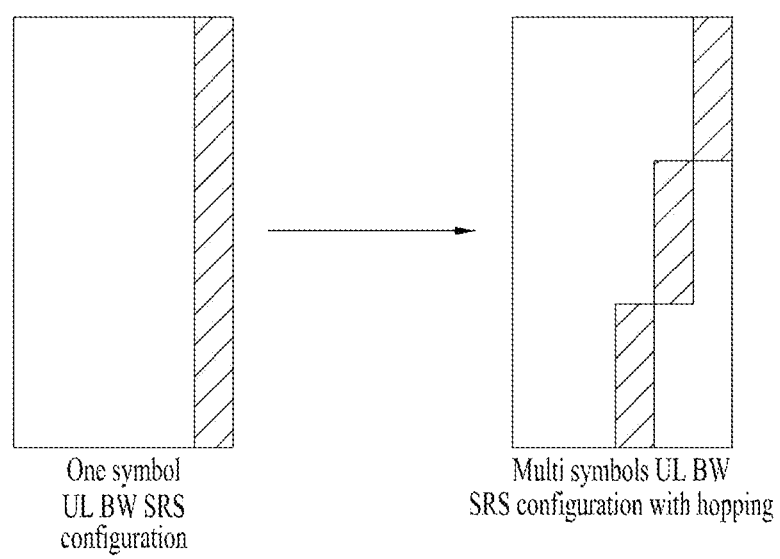
FIG. 10 is a diagram illustrating multi-symbol SRS triggering for uplink beam management.

FIG. 10 is a diagram illustrating multi-symbol SRS triggering for UL beam management.

Referring to FIG. 10, although UL SRS bandwidth may be configured in one symbol, multi-symbol SRS may be triggered and configured for the purpose of UL beam management, etc. When the multi-symbol SRS is triggered and the same Tx precoding is performed in SRS resources (or SRS transmission resources) which is hopped on each symbol, the UE may provide much transmit (Tx) power per SRS symbol. The BS may perform subband selection through a symbol indication after detecting SRS resources per symbol.

Proposal 1

The BS may configure some or all of combinations of SRS sequence generation parameters (e.g., transmission comb (TC), TC offset, cyclic shift (CS), and root) for SRS resources, in which frequency hopping is performed, are changed according to the (frequency) hopping pattern, and the BS may transmit the configured information to the UE or transmit changed values of the SRS sequence generation parameter values, which desire to be changed, to the UE.

Proposal 1-1

As the detailed proposal of Proposal 1, in Proposal 1-1, SRS sequence generation parameters (e.g., TC, TC offset, CS, root, etc.) configured for the allocated SRS resource are differently applicable according to the frequency hopping pattern when frequency hopping is enabled. Additionally, by changing the SRS sequence generation parameters according to frequency hopping without additionally increasing dynamic UL downlink control information (DCI) overhead, the BS may determine whether a specific frequency hopping pattern is properly performed with respect to the UE after SRS detection.

Figure 11:
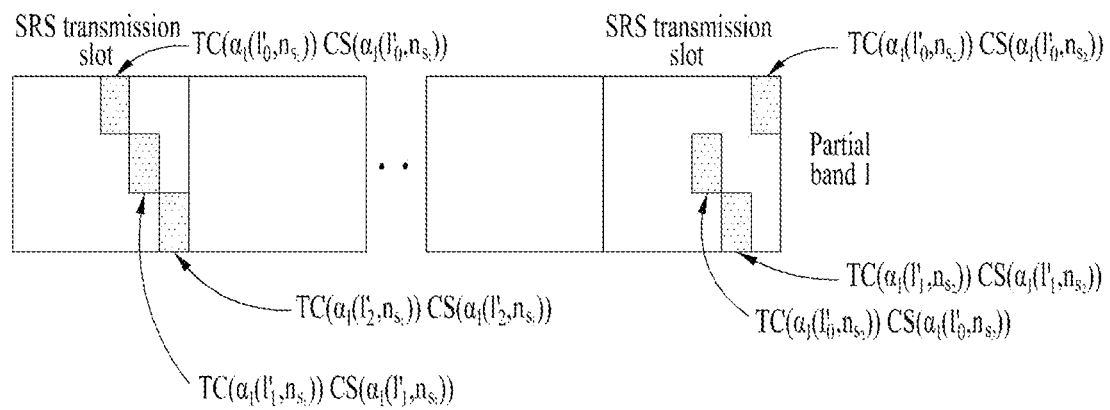
FIG. 11 is a diagram illustrating a combination $\{TC(\alpha_1(l',n_s)),CS(\alpha_1(l',n_s))\}$ of SRS sequence generation parameters according to a hopping pattern $\alpha_1(l',n_s)$.

FIG. 11 is a diagram illustrating a combination {TC($\alpha_1$(l',$n_s$)),CS($\alpha_1$(l',$n_s$))} of SRS sequence generation parameters according to a hopping pattern $\alpha_1$(l',$n_s$).

Referring to FIG. 11, when the hopping pattern $\alpha_1$(l',$n_s$) is configured for UE A (where l' denotes a configured SRS symbol index and $n_s$ denotes a configured SRS slot index), a combination of SRS sequence generation parameters corresponding to specific l', $n_s$, and $n_f$ (where $n_f$ is a frame index) may be represented by {TC($\alpha_1$(l',$n_s$)),TC_offset($\alpha_1$(l',$n_2$)),CS($\alpha_1$(l',$n_s$)),root($\alpha_1$(l',$n_s$))}

Proposal 1-2

The BS transmits a subset of SRS sequence generation parameters among SRS sequence generation parameters (e.g., TC, TC offset, CS, root, etc.) configured for SRS resources in which frequency hopping (e.g., intra-slot hopping (or referred to as symbol-level hopping) or inter-slot hopping (or referred to as slot level hopping)) is enabled through radio resource control (RRC) signaling of Layer 3 and transmits the remaining subset of the SRS generation parameters configured for the allocated SRS resources through downlink control information (DCI) (or DCI format) of Layer 1. The configuration of the subset of the SRS sequence generation parameters is as follows.

The BS transmits the TC, TC offset, and CS values to the UE through dedicated RRC signaling and transmits the root value to the UE through DCI. In order for the UE to differently apply the root value according to symbol when the multiple symbol SRSs (or may be referred as multiple symbol SRS resources) are configured in one SRS transmission slot, the BS may transmit the root values corresponding to the number of multiple symbol SRSs to the UE through DCI or may equally set a root value of sequences of the multiple symbol SRSs and then transmit one root value to the UE.

The BS may transmit TC and TC offset through dedicated RRC signaling and transmit CS and root values through DCI.

The BS may transmit only the TC value through dedicated RRC signaling and transmit TC offset, CS, and root values through DCI.

The BS may transmit only the CS value through dedicated RRC signaling and transmit the remaining subset (e.g., TC, TC offset, and root) through DCI.

The BS may transmit only the root value through dedicated RRC signaling and transmit the remaining subset (e.g., TC, TC offset, and CS) through DCI.

The BS may transmit various combinations of TC, TC offset, CS, and root values through DCI or RRC signaling.

The UE may generate sequences by variously combining SRS sequence generation parameters according to hopping, thereby improving PAPR or low correlation properties. However, overhead may be increased due to DCI transmission.

Figure 12:
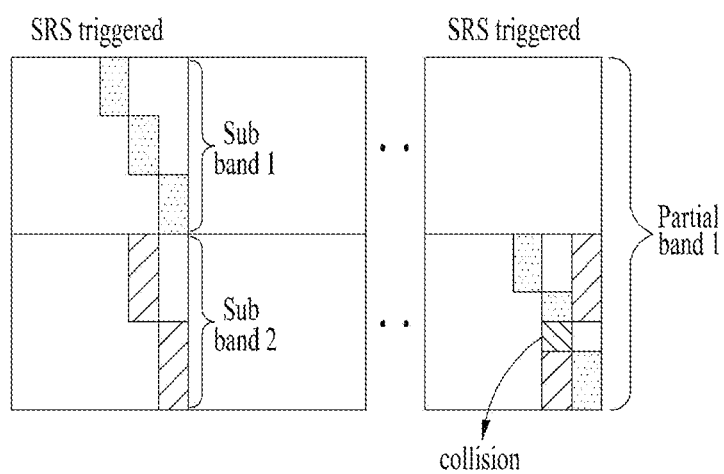
FIG. 12 is a diagram illustrating occurrence of collision between UEs at the time of hopping.

FIG. 12 is a diagram illustrating occurrence of collision between UEs when hopping is performed.

As one embodiment, 1) when the sequence parameter indices in resources to be allocated in SRS transmission slot 1 are TC=1, TC offset=0, CS=5, and root=10, the sequence parameter indices in resources to be allocated in next SRS transmission slot 2 are changed to TC=1, TC offset=0, CS=8, and root=11. In SRS transmission slot 2, CS=8 and root=11 may be transmitted through DCI or inferred by a hopping pattern.

As another embodiment, when a truncated ZC SRS sequence is used, different resources in SRS transmission slot 1 are allocated to UE 1 and UE 2. However, in next SRS transmission slot 2, resources of UE 1 and UE 2 overlap in terms of a specific SRS symbol index and CS=3 of UE 1 and CS=3 of UE 2 are applied and thus the BS changes CS=3 of UE 2 to CS=5 of UE 2, thereby maintaining low-correlation properties.

Proposal 1-3

As a combination of sequence generation parameters (e.g. TC, TC offset, CS, and root) configured for SRS resources in which frequency hopping (e.g., intra-slot hopping, inter-slot hopping, etc.) is enabled, in order to reduce DCI signaling overhead, the BS may transmit a specific set to the UE through RRC signaling and transmit DCI including a request field to the UE and the UE may acquire information on a sequence combination corresponding to SRS resources which hopping is performed. As one embodiment, Table 2 below shows a set of sequence generation parameters transmitted by the BS through the DCI. It has been approved that SRS frequency hopping should be supported in multiple SRS symbols configured in 3GPP RAN1 88 biz, and frequency hopping between slots in which SRS is configured should be supported. When one multi-symbol SRS is triggered, SRS configuration for full-band UL resource allocation may be necessary while a certain SRS resource hops. SRS configuration for full-band UL resource allocation also may be necessary for UL beam management. For example, when multiple SRSs are triggered for UL beam management of an NR UE, subband-wise UL beam management using the same Tx precoding of the NR UE may be necessary.

FIG. 10 is a diagram illustrating multi-symbol SRS triggering for UL beam management.

Referring to FIG. 10, although UL SRS bandwidth may be configured in one symbol, multi-symbol SRS may be triggered and configured for the purpose of UL beam management, etc. When the multi-symbol SRS is triggered and the same Tx precoding is performed in SRS resources (or SRS transmission resources) which is hopped on each symbol, the UE may provide much transmit (Tx) power per SRS symbol. The BS may perform subband selection through a symbol indication after detecting SRS resources per symbol.

Proposal 1

The BS may configure some or all of combinations of SRS sequence generation parameters (e.g., transmission comb (TC), TC offset, cyclic shift (CS), and root) for SRS resources, in which frequency hopping is performed, are changed according to the (frequency) hopping pattern, and the BS may transmit the configured information to the UE or transmit changed values of the SRS sequence generation parameter values, which desire to be changed, to the UE.

Proposal 1-1

As the detailed proposal of Proposal 1, in Proposal 1-1, SRS sequence generation parameters (e.g., TC, TC offset, CS, root, etc.) configured for the allocated SRS resource are differently applicable according to the frequency hopping pattern when frequency hopping is enabled. Additionally, by changing the SRS sequence generation parameters according to frequency hopping without additionally increasing dynamic UL downlink control information (DCI) overhead, the BS may determine whether a specific frequency hopping pattern is properly performed with respect to the UE after SRS detection.

FIG. 11 is a diagram illustrating a combination {TC($\alpha_1$(l',$n_s$)),CS($\alpha_1$(l',$n_s$))} of SRS sequence generation parameters according to a hopping pattern $\alpha_1$(l',$n_s$).

Referring to FIG. 11, when the hopping pattern $\alpha_1$(l',$n_s$) is configured for UE A (where l' denotes a configured SRS symbol index and $n_s$ denotes a configured SRS slot index), a combination of SRS sequence generation parameters corresponding to specific l', $n_s$, and $n_f$ (where $n_f$ is a frame index) may be represented by $$\{TC(\alpha_1(l',n_s)),TC\_\text{offset}(\alpha_1(l',n_2)),CS(\alpha_1(l',n_s)),\text{root}(\alpha_1(l',n_s))\}$$

Proposal 1-2

The BS transmits a subset of SRS sequence generation parameters among SRS sequence generation parameters (e.g., TC, TC offset, CS, root, etc.) configured for SRS resources in which frequency hopping (e.g., intra-slot hopping (or referred to as symbol-level hopping) or inter-slot hopping (or referred to as slot level hopping)) is enabled through radio resource control (RRC) signaling of Layer 3 and transmits the remaining subset of the SRS generation parameters configured for the allocated SRS resources through downlink control information (DCI) (or DCI format) of Layer 1. The configuration of the subset of the SRS sequence generation parameters is as follows.

- The BS transmits the TC, TC offset, and CS values to the UE through dedicated RRC signaling and transmits the root value to the UE through DCI. In order for the UE to differently apply the root value according to symbol when the multiple symbol SRSs (or may be referred as multiple symbol SRS resources) are configured in one SRS transmission slot, the BS may transmit the root values corresponding to the number of multiple symbol SRSs to the UE through DCI or may equally set a root value of sequences of the multiple symbol SRSs and then transmit one root value to the UE.
- The BS may transmit the TC and TC offset through dedicated RRC signaling and transmit CS and root values through DCI.
- The BS may transmit only the TC value through dedicated RRC signaling and transmit TC offset, CS, and root values through DCI.
- The BS may transmit only the CS value through dedicated RRC signaling and transmit the remaining subset (e.g., TC, TC offset, and root) through DCI.
- The BS may transmit only the root value through dedicated RRC signaling and transmit the remaining subset (e.g., TC, TC offset, and CS) through DCI.
- The BS may transmit various combinations of TC, TC offset, CS, and root values through DCI or RRC signaling.

The UE may generate sequences by variously combining SRS sequence generation parameters according to hopping, thereby improving PAPR or low correlation properties. However, overhead may be increased due to DCI transmission.

FIG. 12 is a diagram illustrating occurrence of collision between UEs when hopping is performed.

As one embodiment, 1) when the sequence parameter indices in resources to be allocated in SRS transmission slot 1 are TC=1, TC offset=0, CS=5, and root=10, the sequence parameter indices in resources to be allocated in next SRS transmission slot 2 are changed to TC=1, TC offset=0, CS=8, and root=11. In SRS transmission slot 2, CS=8 and root=11 may be transmitted through DCI or inferred by a hopping pattern.

As another embodiment, when a truncated ZC SRS sequence is used, different resources in SRS transmission slot 1 are allocated to UE 1 and UE 2. However, in next SRS transmission slot 2, resources of UE 1 and UE 2 overlap in terms of a specific SRS symbol index and CS=3 of UE 1 and CS=3 of UE 2 are applied and thus the BS changes CS=3 of UE 2 to CS=5 of UE 2, thereby maintaining low-correlation properties.

Proposal 1-3

As a combination of sequence generation parameters (e.g. TC, TC offset, CS, and root) configured for SRS resources in which frequency hopping (e.g., intra-slot hopping, inter-slot hopping, etc.) is enabled, in order to reduce DCI signaling overhead, the BS may transmit a specific set to the UE through RRC signaling and transmit DCI including a request field to the UE and the UE may acquire information on a sequence combination corresponding to SRS resources which hopping is performed. As one embodiment, Table 2 below shows a set of sequence generation parameters transmitted by the BS through the DCI.

TABLE 2

| | Sequence request field (symbol-level hopping) | | | |
|---|---|---|---|---|
| | '00' | '01' | '10' | '11' |
| Combination of sequence generation parameters | TC = 2, TC offset = 0, CS = 4, root = 10 | TC = 2, TC offset = 1, CS = 8, root = 11 | TC = 4, TC offset = 0, CS = 11, root = 2 | TC = 4, TC offset = 3, CS = 7, root = 3 |

Upon receiving the request field for the sequence generation parameters in an SRS allocation resource (e.g., slot) indicating "01" through DCI, the UE may generate a sequence for SRS transmission in the corresponding resource (e.g., corresponding slot) using TC=2, TC offset=1, CS=8, and root=11. When the number of multiple SRS symbols in the SRS slot is 2, the UE may continuously receive the request fields of "00" and "10" from the BS. In this case, the UE may generate the SRS sequence in a first SRS symbol using TC=2, TC offset=0, CS=4, and root=10 and generate the SRS sequence in a second SRS symbol using TC=4, TC offset=0, CS=11, and root=2. Alternatively, when the request field indicates "10", the UE may generate the same SRS sequence in two symbols using TC=4, TC offset=0, CS=11, and root=2.

Proposal 1-4

The BS may configure that sequence generation parameters (e.g., TC, TC offset, CS, and root values) configured for SRS resource, in which frequency hopping (e.g., intra-slot hopping or inter-slot hopping) is enabled, are not changed when frequency hopping is performed. It may be desirable when hopping is performed with the most general sequence generation parameter configuration, that an overlapped frequency region in a specific SRS instance be avoided or a hopping pattern be generated such that low correlation is achieved in the overlapping frequency region.

Proposal 2

A frequency hopping configuration method may be divided into a slot level frequency hopping configuration (inter-slot hopping configuration) and a symbol-level frequency hopping configuration (intra-slot hopping configuration).

Parameters for Inter-Slot Hopping Configuration

When the parameters for inter-slot hopping configuration include SRS resource position information: the parameters for inter-slot hopping configuration may include a value indicating an SRS resource allocation band and SRS resource allocation position in each slot (e.g., an SRS allocation start RE value, an SRS allocation start RB value, an SRS allocation end RE value, and an SRS allocation end RB value for a specific UE, and a value indicating an SRS transmission range and a frequency position of each slot (e.g., a resource indication value (RIV)), a subband index applied within one slot, and a partial band index applied within one slot), an inter-slot hopping cycle, an inter-slot hopping enable flag, etc.

When the hopping pattern is used: the parameters for inter-slot hopping configuration may include an inter-slot hopping cycle, an inter-slot hopping enable flag, and an inter-slot hopping pattern.

Parameters for Intra-Slot Hopping Configuration

When the parameters for intra-slot hopping configuration include SRS resource position information: the parameters for intra-slot hopping configuration may include a value indicating the SRS resource allocation position in each symbol (e.g., an RIV, an RE/RB index, a subband index, and a partial band index), the number of configured SRS symbols in the SRS transmission slot and an index, an intra-slot hopping cycle, an intra-slot hopping enable flag, etc.

When the hopping pattern is used: the parameters for intra-slot hopping configuration may include the number of configured SRS symbols in the SRS transmission slot and an index, an intra-slot hopping cycle, an intra-slot hopping pattern, an intra-slot hopping enable flag, etc. The BS may transmit such parameters to the UE according to the following configuration.

Hopping configuration may be two combinations of intra-slot/inter-slot hopping and the hopping cycle may be defined as follows. The intra-slot hopping cycle may be defined as the number of SRS symbols until an SRS resource allocated according to the number of SRS symbols in a given SRS slot hops on each symbol and returns to an original SRS frequency position. The inter-slot hopping cycle may be defined as the number of SRS slots until the SRS resource hops on each SRS slot and returns to an original SRS frequency position.

Proposal 2-1

In the case of a periodic/semipersistent SRS, the BS may transmit the parameters for intra-slot hopping configuration to the UE through dedicated RRC signaling and transmit the parameters for inter-slot hopping configuration to the UE through DCI for an SRS transmission slot. DCI signaling overhead is increased in each SRS transmission slot, but inter-slot hopping information may be dynamically acquired to flexibly configure inter-slot hopping. As an embodiment, an example of transmitting the parameters for intra-slot hopping through RRC signaling and transmitting the parameters for inter-slot hopping configuration through DCI when periodic/semipersistent SRS triggering is performed will be illustrated.

Figure 13:
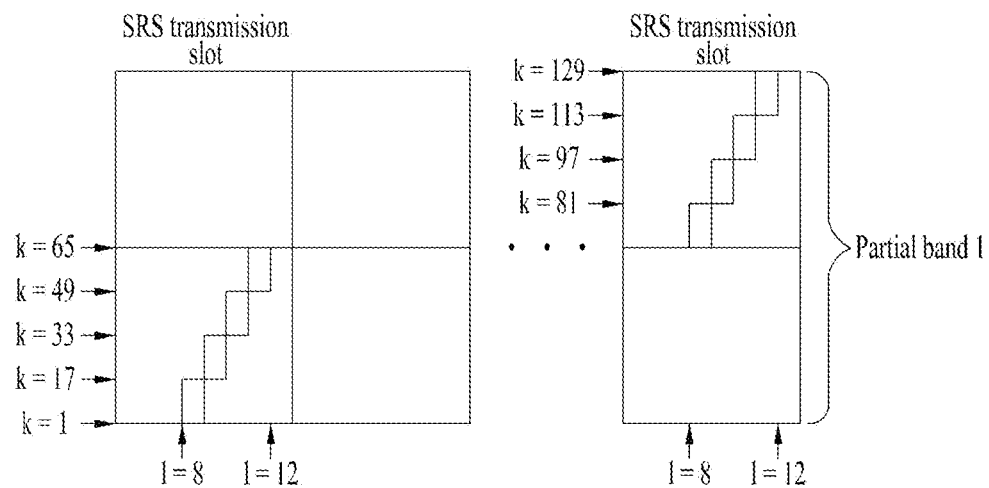
FIG. 13 illustrates an example of transmitting symbol-level hopping parameters through RRC signaling and transmitting slot-level hopping parameter through DCI signaling.

FIG. 13 illustrates an example of transmitting intra-slot hopping parameters through RRC signaling and transmitting inter-slot hopping parameters through DCI signaling.

Referring to FIG. 13, as an example of (dedicated) RRC signaling for intra-slot hopping configuration, the following information is transmitted through (dedicated) RRC signaling: the SRS configuration (allocation) start RB index=1, the SRS configuration (allocation) end RB index=17, the SRS BW=16 RBs, the number of configured SRS symbols in the SRS transmission slot=4, the start symbol position index of the configured SRS=8, the end symbol position index of the configured SRS=11, the partial band index=1, and the symbol hopping cycle=4 symbols.

Referring to FIG. 13, as an example of DCI signaling for inter-slot hopping configuration, the following information is transmitted through DCI signaling.

The DCI for the first SRS slot may indicate the SRS start RB index=1, the SRS end RB index=65, the partial band index=1, the inter-slot hopping cycle: 2 SRS slots, etc.

The DCI for the second SRS slot may indicate the SRS allocation start RB index=65, the SRS allocation end RB index=129, the partial band index=1, the inter-slot hopping cycle: 2 SRS slots, etc.

The inter-slot/intra-slot hopping pattern may be understood by the following example. In NR, when the number of slots in one frame $n_f$ is $N_s$, the index of each slot is expressed as $n_n$, l' is the symbol index of the configured SRS, and $T_{SRS}$ is an SRS transmission cycle, $n_{SRS}$ for hopping may be configured as shown in Equation 2 below.

$$n_{SRS} = l', k_0^{(p)} = \overline{k}_0^{(p)} + F(i_{sb}, n_f, n_s, T_{SRS}) + \sum_{b=0}^{B_{SRS}} {}'K_{TC}M_{sc,b}^{RS}n_b,$$ Equation 2 where, $F(i_{sb}, n_f, n_s, T_{SRS})$ is an intra-slot hopping position function according to a subband index $i_{sb}$. $B_{SRS}$ spans on one SRS subband.

$F(i_{sb}, n_f, n_s, T_{SRS}) = (i_{sb}(n_f, n_s, T_{SRS})-1) \times BW_{sb}$ and $BW_{sb}$ is the number of REs indicating the bandwidth of the subband.

$i_{sb}(n_f, n_s, T_{SRS}) = c(n_f, n_s, T_{SRS}) \bmod I_{sb}$ and $I_{sb}$ is a total number of subbands. $c( )$ is a scrambling function.

FIG. 13 shows an example in which, after hopping is performed in a localized frequency region, hopping configuration in another localized frequency region is enabled in a next SRS transmission slot. In a UE having a narrow band RF, it is advantageous to perform hopping in a localized frequency region and to perform hopping in another localized frequency region in the next slot in consideration of retuning delay.

As another example, when periodic SRS triggering occurs, the BS may transmit parameters for intra-slot hopping through RRC signaling and transmit parameters for inter-slot hopping configuration through DCI signaling.

Figure 14:
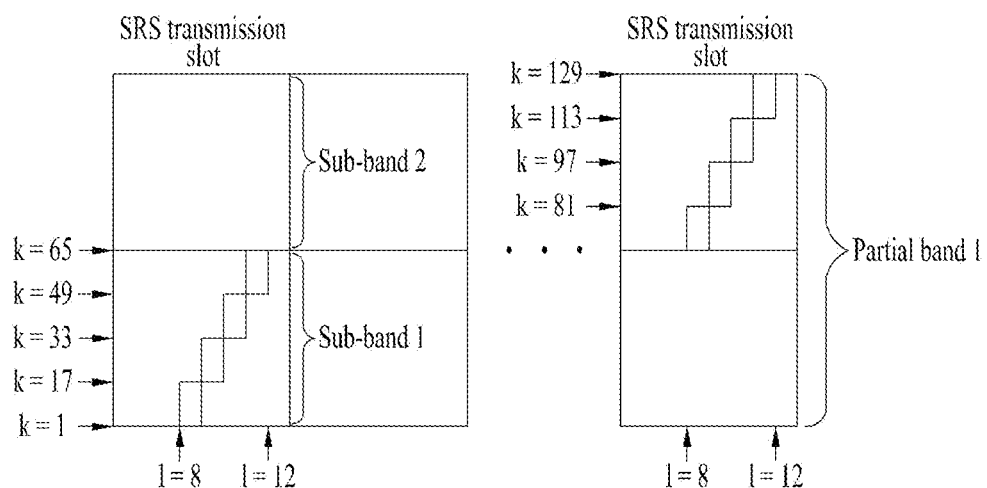
FIG. 14 is a diagram illustrating the case in which a BS transmits intra-slot hopping parameters through DCI signaling and transmits inter-slot hopping parameters through RRC signaling.

FIG. 14 is a diagram illustrating the case in which a BS transmits intra-slot hopping parameters through DCI signaling and transmits inter-slot hopping parameters through RRC signaling.

Example of Transmission of DCI for Inter-Slot Hopping Configuration

The BS may indicate the SRS subband index (1 to 64 RBs)=1, the partial band index=1, and the inter-slot hopping cycle=2 SRS slots, in DCI for the first SRS slot. The BS may indicate the SRS subband index (1 to 64 RBs)=2, the partial band index=1, and the inter-slot hopping cycle=2 SRS slots, in DCI for the second SRS slot.

Proposal 2-1-2

In the case of a periodic SRS and/or semipersistent SRS, the BS may transmit parameters for inter-slot hopping configuration to the UE through (dedicated) RRC signaling and transmit parameters for intra-slot hopping configuration to the UE through DCI for an SRS transmission slot.

This may be considered when intra-slot hopping is flexibly applied in a fixed inter-slot hopping pattern. However, parameter transmission overhead for intra-slot hopping is increased.

Figure 15:
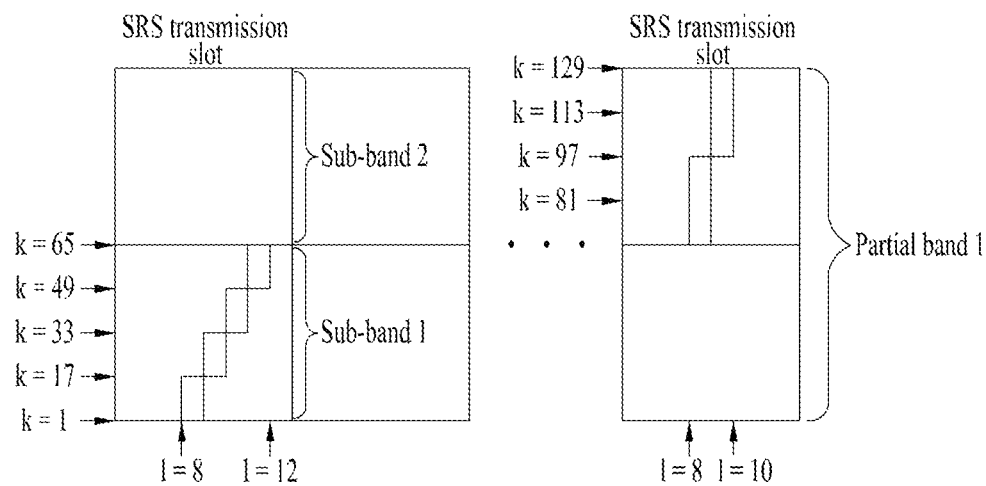
FIG. 15 illustrates the case where a BS transmits symbol-level hopping parameters through RRC signaling and transmits slot-level hopping parameters through DCI according to Proposal 2-1-2.

FIG. 15 illustrates the case where a BS transmits intra-slot hopping parameters through RRC signaling and transmits inter-slot hopping parameters through DCI according to Proposal 2-1-2.

As one embodiment, at the time of periodic/semipersistent SRS transmission, the BS may transmit parameters for inter-slot hopping configuration through RRC signaling and transmit parameters for intra-slot hopping configuration through DCI (when the SRS resource position of each symbol is designated). Hereinafter, this will be described with reference to FIG. 15.

Example of transmission of (dedicated) RRC signaling for inter-slot hopping configuration: The (dedicated) RRC signaling for inter-slot hopping configuration may indicate the SRS allocation start RB index=1, the SRS allocation end RB index=129 RBs, the partial band index=1, and the inter-slot hopping cycle=2 SRS slots.

Example of Transmission of DCI for Intra-Slot Hopping Configuration

The DCI for the first SRS slot may indicate the SRS BW=16 RBs, the number of configured SRS symbols in the SRS transmission slot=4, the start symbol position of the configured SRS=8, the allocation end symbol position of the configured SRS=11, the partial band index=1, and the symbol hopping cycle=4 symbols. As shown in FIG. 15, the DCI for the first SRS slot indicates the first symbol SRS start RB index=1, the first symbol SRS end RB index=17, the second symbol SRS start RB index=17, the second symbol SRS end RB index=33, the third symbol SRS start RB index=33, the third symbol SRS end RB index=49, the fourth symbol SRS start RB index=49, and the fourth symbol SRS end RB index=65.

The DCI for the second SRS slot may indicate the SRS BW=32 RBs, the number of configured SRS symbols in the SRS transmission slot=2, the start symbol position of the configured SRS=8, the end symbol position of the configured SRS=9, partial band index=1, and the symbol hopping cycle=2 symbols. As shown in FIG. 15, the DCI for the first SRS slot indicates the 1st symbol SRS start RB index=65, the first symbol SRS end RB index=97, the second symbol SRS allocation start RB index=97, and the second symbol SRS allocation end RB index=129.

As another embodiment, at the time of periodic SRS transmission, the BS may transmit parameters for inter-slot hopping configuration through RRC signaling and transmit parameters for intra-slot hopping configuration through DCI (however, the SRS resource position of each symbol is determined by the intra-slot hopping pattern).

The (dedicated) RRC signaling for inter-slot hopping configuration may indicate the SRS allocation start RB index=1, the SRS allocation end RB index=129, partial band index=1, and the inter-slot hopping cycle=2 SRS slots.

The (dedicated) RRC signaling for intra-slot hopping configuration may indicate the SRS BW=16 RBs, the number of configured SRS symbols in the SRS transmission slot=4, the start symbol position of the configured SRS=8, the end symbol position of the configured SRS=11, the partial band index=1, the subband index in a partial band=1, and the symbol hopping cycle=4 symbols. The DCI for the second SRS slot may indicate the SRS BW=32 RBs, the number of configured SRS symbols in the SRS transmission slot=2, the start symbol position of the configured SRS=8, the end symbol position of the configured SRS=9, the partial band index=1, the subband index in a partial band=2, and the symbol hopping cycle=2 symbols.

Proposal 2-1-3

In the case of periodic/semipersistent SRS, the BS may transmit parameters for inter-slot frequency hopping configuration and parameters for intra-slot hopping configuration to the UE through (dedicated) RRC signaling. The configuration of Proposal 2-1-3 has smallest overhead for frequency hopping. When applying intra-slot hopping and inter-slot hopping, hopping is regularly performed according to hopping pattern.

Figure 16:
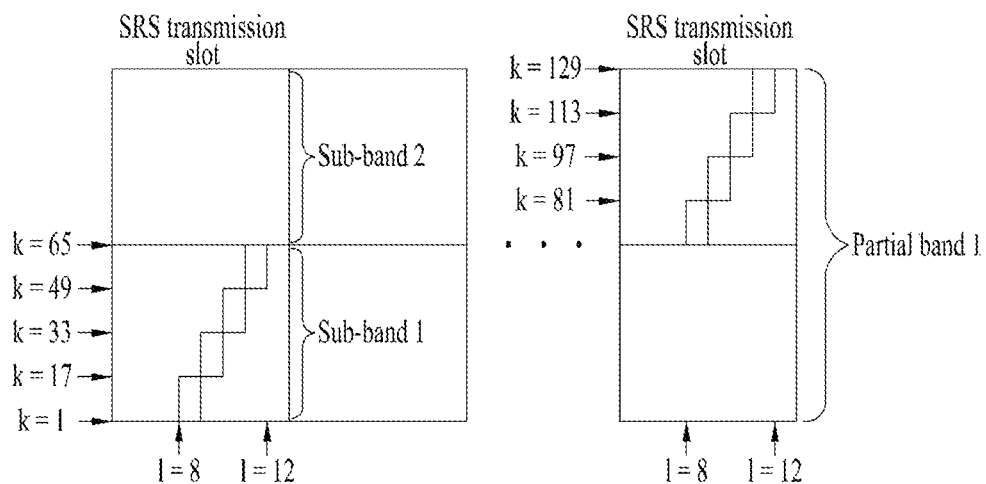
FIG. 16 is a diagram illustrating an example of transmitting parameters for symbol-level hopping configuration and parameters for slot-level hopping configuration through RRC signaling according to Proposal 2-1-3.

FIG. 16 is a diagram illustrating an example of transmitting parameters for intra-slot hopping configuration and parameters for inter-slot hopping configuration through RRC signaling according to Proposal 2-1-3.

Example of (Dedicated) RRC for Inter-Slot Hopping Configuration

Dedicated RRC signaling for inter-slot hopping configuration may indicate the SRS allocation start RB index=1, the SRS allocation end RB index=129, the partial band index=1, and the inter-slot hopping cycle=2 SRS slots.

Example of (Dedicated) RRC for Intra-Slot Hopping Configuration

Dedicated RRC signaling for intra-slot hopping configuration may indicate the SRS allocation start RB index=1, the SRS allocation end RB index=17, the SRS BW=16 RBs, the number of configured SRS symbols in the SRS transmission slot=4, the start symbol position of the configured SRS=8, the end symbol position of the configured SRS=11, the partial band index=1, and the symbol hopping cycle=4 symbols.

Proposal 2-1-4

In the case of periodic/semipersistent SRS, the BS may transmit parameters for inter-slot hopping configuration and parameters for intra-slot hopping configuration through (dedicated) RRC and may transmit some parameters through DCI for hopping information of the SRS transmission slot. By acquiring dynamic information of specific parameters, flexible configuration may be enabled at the time of hopping. In this case, overhead is not large.

Example of Transmission of DCI of Some Hopping Parameters

Dedicated RRC signaling for inter-slot hopping configuration may indicate the SRS allocation start RB index=1, the SRS allocation end RB index=129, the partial band index=1, and the inter-slot hopping cycle=2 SRS slots. Dedicated RRC signaling for intra-slot hopping configuration may indicate the SRS BW=16 RBs, the number of configured SRS symbols in the SRS transmission slot=4, the start symbol position of the configured SRS=8, the end symbol position of the configured SRS=11, the partial band index=1, and the symbol hopping cycle=4 symbols.

DCI for Intra-Slot Hopping Configuration

The DCI for the first SRS slot may indicate the SRS subband index (1 to 64 RBs)=1. The DCI for the second SRS slot may indicate the SRS subband index (1 to 64 RBs)=2.

Proposal 2-1-5

In the case of periodic/semipersistent SRS, during the hopping cycle (from when hopping is performed in a hopping start resource to when returning to the position of the hopping start resource), a parameter (e.g., a hopping offset value) for differentiating an inter-symbol hopping pattern at the time of next hopping is defined. This parameter may be transmitted through DCI or RRC signaling.

The hopping offset according to Proposal 2-1-5 may differentiate the hopping pattern at a predetermined time, thereby dispersing interference occurring at the time of hopping. As an embodiment, a parameter for differentiating the hopping pattern according to the hopping cycle is applicable.

Figure 17:
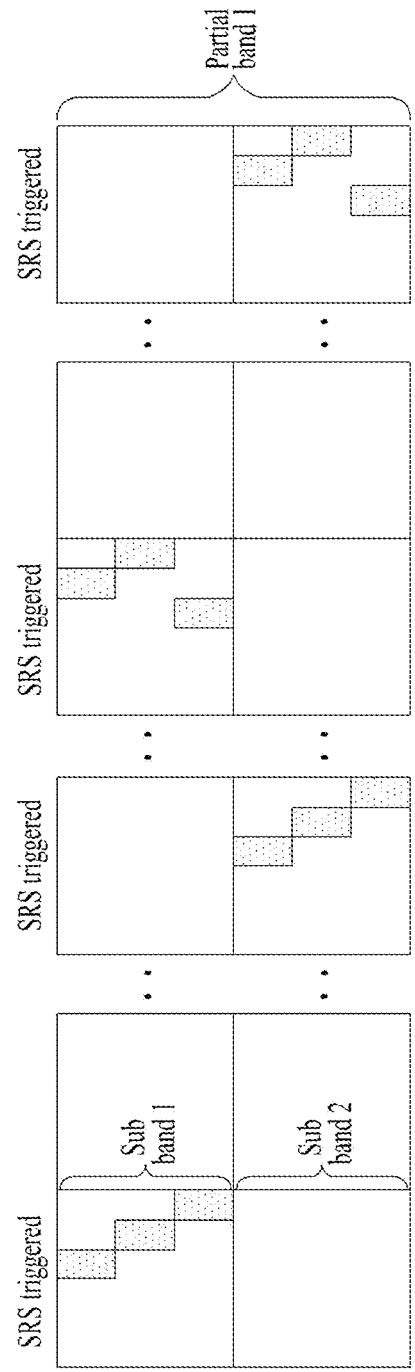
FIG. 17 is a diagram illustrating an example of applying different symbol-level hopping patterns according to hopping cycle.

FIG. 17 is a diagram illustrating an example of applying different intra-slot hopping patterns for each hopping cycle.

When considering a parameter $h_{shift}$ for changing the intra-slot hopping pattern for each hopping cycle, the BS may transmit $h_{shift}$ to the UE through DCI every hopping cycle or $h_{shift}$ is expressed according to $T_{hopping}$ in Equation 3, such that hopping is performed with the intra-slot hopping pattern other than the intra-slot hopping pattern used in a previous hopping cycle as shown in FIG. 15.

When hopping cycle $T_{hopping}$=4 slot, Equation 3 below is obtained.

$$n_{SRS}=(l'+h_{shift}) \bmod L', h_{shift}=\lfloor(n_j \times N_s+n_s)/T_{hopping}\rfloor \quad \text{Equation 3}$$

where, L' denotes the number of symbols of the SRS allocated to one SRS slot.

$T_{hopping}$ may be expressed using the length of an SRS resource allocated to one symbol, a UL BW length, $T_{SRS}$, and L'. That is, $T_{hopping}=BW_{UL}/BW_{SRS}/L' \times T_{SRS}$ Proposal 2-2-1

In the case of aperiodic SRS, the BS may configure parameters for inter-slot hopping configuration and parameters for intra-slot hopping configuration and transmit the parameters to the UE through (dedicated) RRC or MAC-CE. When the BS transmits through MAC-CE, a valid period (or interval) of the hopping parameters transmitted through the MAC-CE is determined using an activation signal, a deactivation signal, or a timer. Hopping may be performed whenever the SRS is dynamically triggered with a predefined intra-slot/inter-slot hopping pattern. In this case, overhead is also small.

Figure 18:
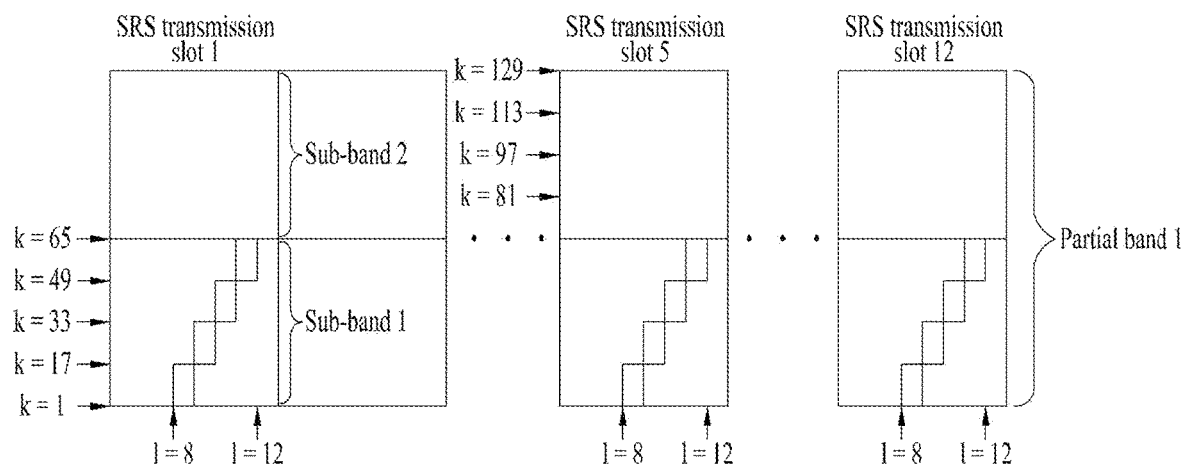
FIG. 18 is a diagram illustrating an example of applying the same symbol-level hopping pattern at the time of aperiodic SRS transmission.

FIG. 18 is a diagram illustrating an example of applying the same intra-slot hopping pattern at the time of aperiodic SRS transmission.

Parameters for inter-slot hopping configuration and parameters for intra-slot hopping configuration may be configured/transmitted through RRC signaling (hopping in a specific subband is applied).

(Dedicated) RRC signaling for inter-slot hopping configuration may indicate the SRS allocation start RB index=1, the SRS allocation end RB index=129, the subband index=1, and the partial band index=1. (Dedicated) RRC signaling for intra-slot hopping configuration may indicate the SRS BW=16 RBs, the number of configured SRS symbols in the SRS transmission slot=4, the configured SRS start symbol position=8, the configured SRS end symbol position=11, the subband index=1, the partial band index=1, and the symbol hopping cycle=4 symbols.

As shown in FIG. 18, parameters for inter-slot hopping configuration and parameters for intra-slot hopping configuration are configured/transmitted through RRC signaling, and the aperiodic SRS is triggered in SRS slot 1, SRS slot 5 and SRS slot 12. If $n_{SRS}=\alpha_1(l')$, $n_{SRS}=\alpha_1(l')$, and $n_{SRS}=\alpha_1(l')$ are configured, the symbol hopping pattern may be equally applied.

Figure 19:
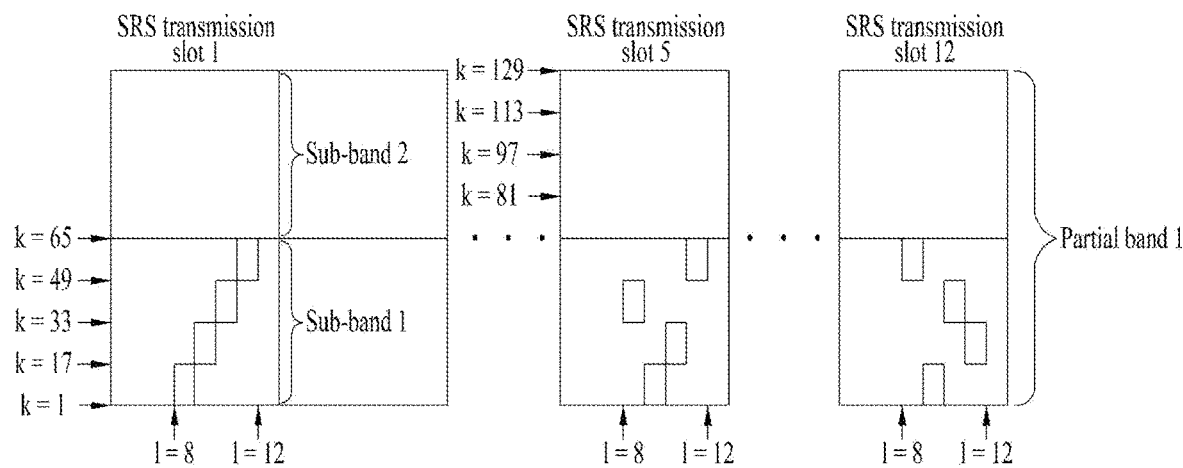
FIG. 19 is a diagram illustrating an example of applying different symbol-level hopping patterns at the time of aperiodic SRS transmission.

FIG. 19 is a diagram illustrating applying different intra-slot hopping patterns at the time of aperiodic SRS transmission.

If $n_{SRS}=\alpha_1(l',1)$, $n_{SRS}=\alpha_1(l',5)$, and $n_{SRS}=\alpha_1(l',12)$ are configured, as shown in FIG. 19, different intra-slot patterns may appear per slot. As another embodiment, the BS may configure/transmit parameters for inter-slot hopping configuration and parameters for intra-slot hopping configuration through RRC signaling (hopping in a partial band is applied).

Figure 20:
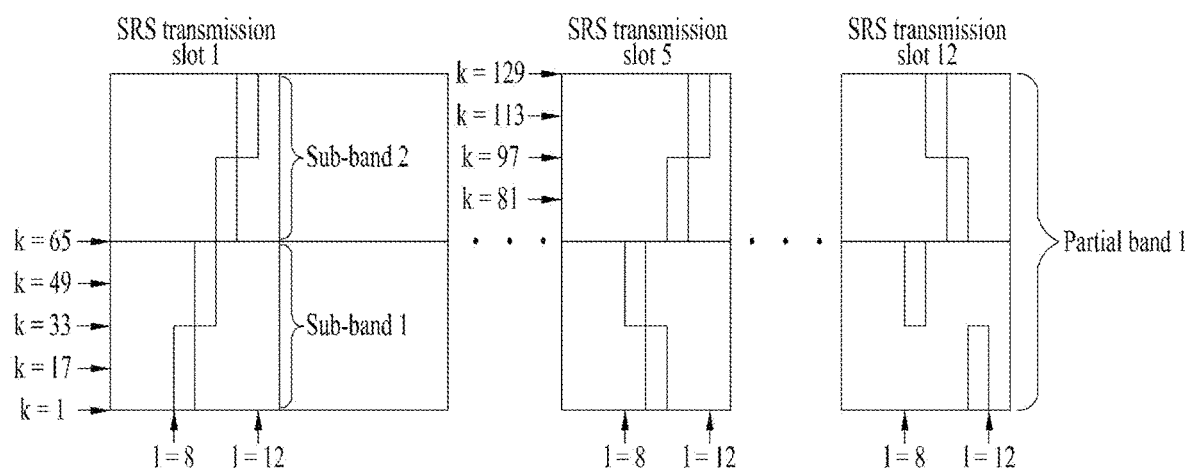
FIG. 20 is a diagram illustrating an example of applying different symbol-level hopping patterns (hopping over a partial band) at the time of aperiodic SRS transmission.

FIG. 20 is a diagram illustrating an example of applying different intra-slot hopping patterns (hopping over a partial band) at the time of aperiodic SRS transmission.

(Dedicated) RRC signaling for inter-slot hopping configuration may indicate the SRS allocation start RB index=1, the SRS allocation end RB index=129, and the partial band index=1. (Dedicated) RRC signaling for intra-slot hopping configuration may indicate the SRS BW=32 RBs, the number of configured SRS symbols in the SRS transmission slot=4, the start symbol position of the configured SRS=8, the end symbol position of the configured SRS=11, the partial band index=1, and the symbol hopping cycle=4 symbols.

As shown in FIG. 20, parameters for inter-slot hopping configuration and parameters for intra-slot hopping configuration are configured/transmitted through RRC signaling and the aperiodic SRS is triggered in SRS slot 1, SRS slot 5, and SRS slot 12. If $n_{SRS}=\alpha_1(l',1)$, $n_{SRS}=\alpha_1(l',5)$ and $n_{SRS}=\alpha_1(l',12)$ are configured, different intra-slot patterns may appear per slot.

Proposal 2-2-2

In the case of the aperiodic SRS, the BS may configure/transmit parameters for inter-slot hopping configuration through (dedicated) RRC signaling and configure/transmit parameters for intra-slot hopping configuration through DCI when the SRS is triggered. In contrast, the BS may configure/transmit parameters for inter-slot hopping configuration through DCI whenever the SRS is triggered and configure/transmit parameters for intra-slot hopping configuration through (dedicated) RRC signaling.

The BS may dynamically provide information on parameters for intra-slot hopping and inter-slot hopping to the UE whenever the SRS is triggered. Of course, in this case, signaling overhead of the BS may be increased.

Figure 21:
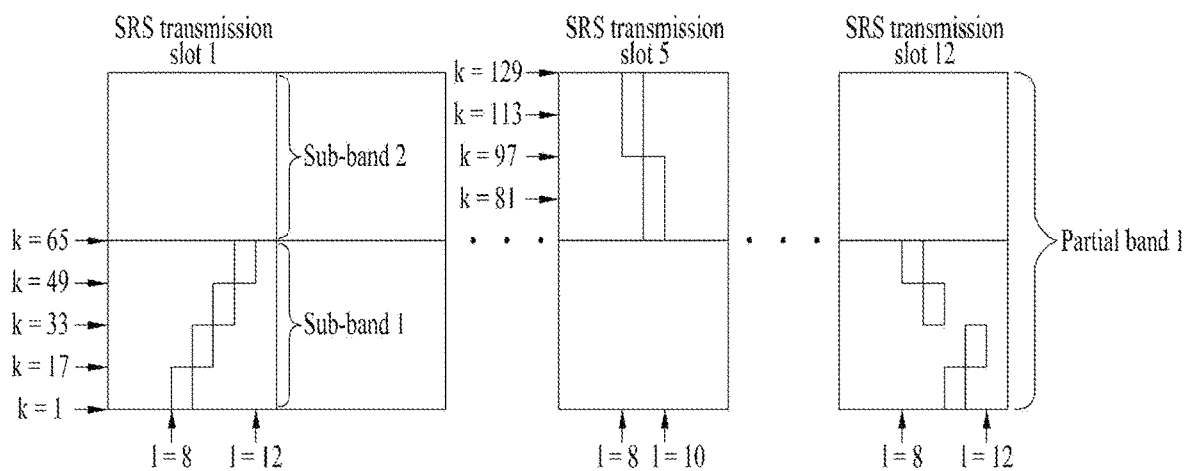
FIG. 21 is a diagram illustrating an example of applying different symbol-level hopping pattern (hopping over a specific subband) at the time of aperiodic SRS transmission.

FIG. 21 is a diagram illustrating an example of applying different intra-slot hopping patterns (hopping over a specific subband) at the time of aperiodic SRS transmission. As an embodiment, in the case of the aperiodic SRS, the BS may configure/transmit parameters for inter-slot hopping configuration through (dedicated) RRC signaling and transmit parameters for intra-slot hopping configuration through DCI. In FIG. 21, the SRS is aperiodically triggered when the SRS slot positions are indices of 1, 5, and 12. The BS may transmit the following information to the UE when indicating that the aperiodic SRS is triggered. (Dedicated) RRC signaling for inter-slot hopping configuration may indicate the SRS allocation start RB index=1, the SRS allocation end RB index=129, and the partial band index=1.

As an example of transmission of DCI for intra-slot hopping configuration, the DCI for SRS slot 1 may indicate the SRS BW=16 RBs, the number of configured SRS symbols in the SRS transmission slot=4, the start symbol position of the configured SRS=8, the end symbol position of the configured SRS=11, the partial band index=1, the subband index in a partial band=1, and the symbol hopping cycle=4 symbols. The DCI for SRS slot 5 may indicate the SRS BW=32 RBs, the number of configured SRS symbols in the SRS transmission slot=2, the start symbol position of the configured SRS=8, the end symbol position of the configured SRS=9, the partial band index=1, the subband index in a partial band=2, and the symbol hopping cycle=2 symbols. The DCI for SRS slot 12 may indicate the SRS BW=16 RBs, the number of configured SRS symbols in the SRS transmission slot=4, the start symbol position of the configured SRS=8, the end symbol position of the configured SRS=11, the partial band index=1, the subband index in a partial band=1, and the symbol hopping cycle=4 symbols.

At this time, if a value indicating the intra-slot pattern is $n_{SRS}=\alpha_1(l',1)$, $n_{SRS}=\alpha_1(l',5)$ and $n_{SRS}=\alpha_1(l',12)$, different intra-slot patterns may be configured per slot.

Proposal 2-2-3

In the case of a periodic SRS, the BS may configure/transmit information on a specific set of parameters for inter-slot hopping configuration and/or parameters for intra-slot hopping configuration to the UE through RRC signaling or DCI including the request field. In this case, signaling overhead may be significantly reduced.

Figure 22:
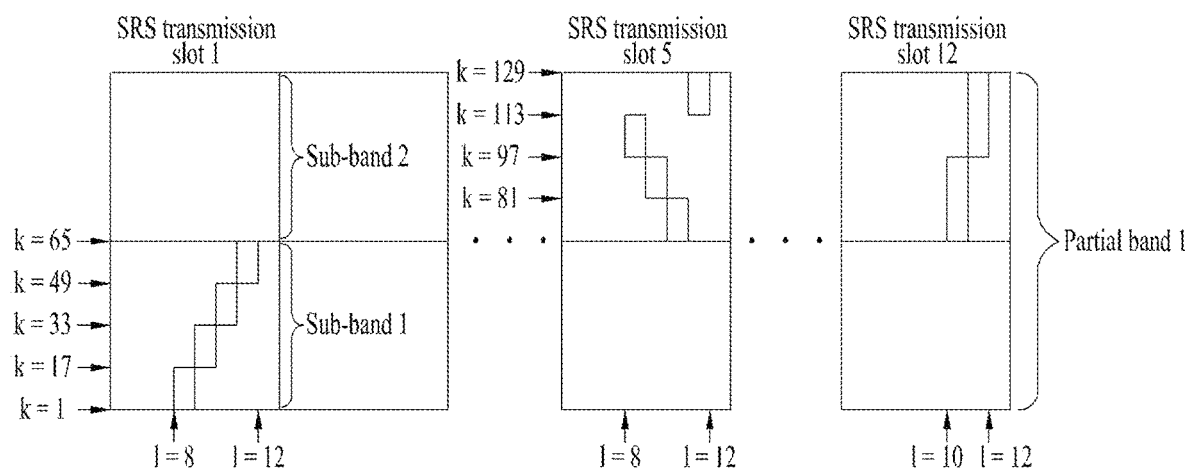
FIG. 22 is a diagram illustrating SRS transmission according to request field transmission using a hopping parameter set at the time of aperiodic SRS transmission.

FIG. 22 is a diagram illustrating SRS transmission according to request field transmission using a hopping parameter set at the time of aperiodic SRS transmission.

Table 4 below shows an intra-slot hopping configuration parameter set according to Proposal 2-2-3.

TABLE 4

| | Request field (in the case of symbol-level hopping) | | | |
| --- | --- | --- | --- | --- |
| | '00' | '01' | '10' | '11' |
| Parameter values for intra-slot hopping configuration | SRS BW = 16 RBs Number of symbols of configured | SRS BW = 16 RBs Number of symbols of configured | SRS BW = 32 RBs Number of symbols of configured | SRS BW = 32 RBs Number of symbols of configured |

TABLE 4-continued

Request field (in the case of symbol-level hopping)

| '00' | '01' | '10' | '11' |
|---|---|---|---|
| SRS in SRS transmission slot = 4 configured SRS start symbol position = 8 configured SRS end symbol position = 11 partial band index = 1 subband index in a partial band = 1 symbol hopping cycle = 4 symbols | SRS in SRS transmission slot = 4 configured SRS start symbol position = 8 configured SRS end symbol position = 11 partial band index = 1 subband index in a partial band = 2 symbol hopping cycle = 4 symbols | SRS in SRS transmission slot = 2 configured SRS start symbol position = 8 configured SRS end symbol position = 9 partial band index = 1 subband index in a partial band = 1 symbol hopping cycle = 2 symbols | SRS in SRS transmission slot = 2 configured SRS start symbol position = 10 configured SRS end symbol position = 11 partial band index = 1 subband index in a partial band = 2 symbol hopping cycle = 2 symbols |

As shown in FIG. 22, the periodic SRS is triggered in slot indexes which SRS slot positions are 1, 5 and 12. FIG. 22 shows that the BS transmits DCI to the UE. It is illustrated that DCI indicates the request field for SRS slot 1 of "00", DCI indicates the request field for SRS slot 5 of "01", and DCI indicates the request field for SRS slot 12 of "11" from the BS to the UE.

Proposal 2-2-4

In the case of the aperiodic SRS, the B S may configure/transmit a set of an inter-slot hopping pattern through RRC signaling, and the BS may transmit an intra-slot hopping request field through DCI when multiple aperiodic SRS symbols are triggered. When the SRS is triggered, different hopping patterns may be flexibly configured between multiple SRS symbols. Table 5 below shows the symbol-level hopping request field.

TABLE 5

| | Intra-slot hopping request field | | | |
|---|---|---|---|---|
| | '00' | '01' | '10' | '11' |
| Hopping pattern function $F(i_{sb}, n_f, n_s, T_{SRS})$ | $F(0, n_f, n_s, T_{SRS})$ | $F(1, n_f, n_s, T_{SRS})$ | $F(2, n_f, n_s, T_{SRS})$ | $F(3, n_f, n_s, T_{SRS})$ |

Proposal 2-2-5

The BS may configure/transmit a set indicating a combination of an intra-slot hopping pattern set (e.g., the hopping request fields '00', '01', '10' and '11' shown in Table 13) and a sequence parameter set (e.g., TC, TC offset, CS, root, etc.) through RRC signaling and transmit one or a plurality of request fields to be applied to a slot in which an SRS is triggered, through UL DCI. For example, Table 6 shows the request field of the sequence parameter set (e.g., TC, TC offset, CS, root, etc.) and the hopping parameter set.

TABLE 6

| | Request field | | | |
|---|---|---|---|---|
| | '00' | '01' | '10' | '11' |
| Hopping pattern function $F(i_{sb}, n_f, n_s, T_{SRS})$ | $F(0, n_f, n_s, T_{SRS})$ | $F(1, n_f, n_s, T_{SRS})$ | $F(2, n_f, n_s, T_{SRS})$ | $F(3, n_f, n_s, T_{SRS})$ |
| Sequence parameter set index | 0 | 1 | 2 | 3 |

The UE may select a hopping pattern and sequence parameter set indicated by the request field received through DCI, generate an SRS sequence, and transmit an SRS.

Proposal 2-2-6

When multiple aperiodic SRS symbols are triggered, a triggering counter N is introduced. The BS may configure/transmit the triggering counter N through DCI or RRC signaling.

Figure 23:
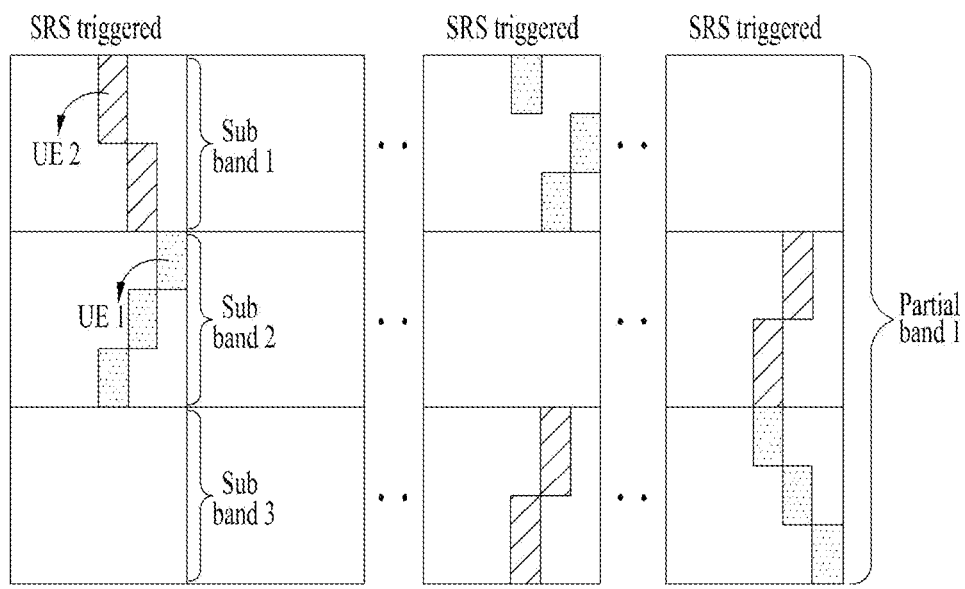
FIG. 23 is a diagram illustrating hoping when a triggering counter N=3.

FIG. 23 is a diagram illustrating hopping when a triggering counter N=3.

In $F(i_{pb}(n \bmod N), n_f, n_s, T_{SRS})$, n may indicate the number of times of triggering the aperiodic multiple SRS symbols starting from a reference UL slot.

Proposal 2-3

In the case of a semipersistent SRS, for intra-slot hopping and/or inter-slot hopping, the BS may configure/transmit parameters for operations of performing hopping and finishing hopping (e.g., an SRS triggered slot index in which slot/symbol-level hopping starts, semipersistent frequency hopping activation, an SRS triggered slot index in which slot/symbol-level hopping ends, and semipersistent frequency hopping deactivation) to the UE through DCI or MAC-CE. A timer for hopping deactivation may operate at the time of activation.

When the semipersistent SRS is activated and hopping is activated, parameters for hopping configuration become valid and, when hopping is deactivated, parameters for hopping configuration do not become valid.

Proposal 2-4

For a UE located at a cell edge in order to acquire SRS receive power, the BS may define the repetition number of SRS symbols, allocate SRS resources at the same position until the repetition number, and configure the UE to perform hopping in a next SRS symbol or a next SRS slot. In this case, the BS may transmit information on the repetition number of SRS symbols to the UE through RRC signaling or UL DCI. Accordingly, the reception side (the BS) may combine the SRS symbols allocated to the same frequency resources by the repetition number.

Figure 24:
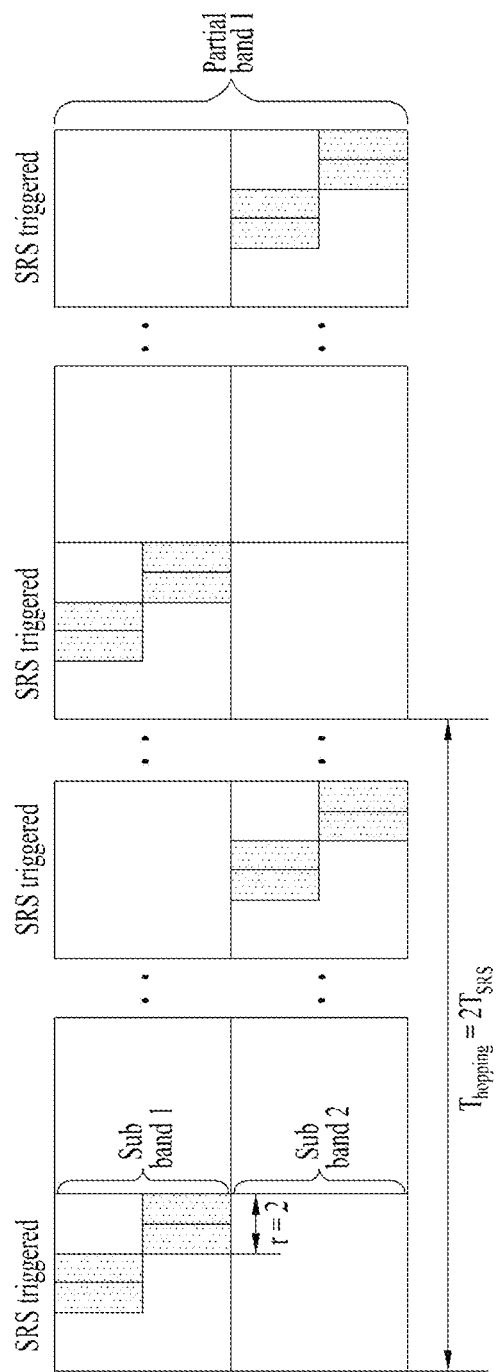
FIG. 24 is a diagram illustrating symbol-level hopping when a repetition number is 2 (r=2)

FIG. 24 is a diagram illustrating symbol-level hopping when a repetition number is 2 (r=2).

As shown in FIG. 24, when the repetition number of symbols is 2 (r=2), L'=4, and $T_{hopping}=2T_{SRS}$, in the case of the periodic SRS, $n_{SRS}=\lfloor l'/r \rfloor + N_{SRS\_symbol}/r \times \lfloor (n_f \times N_s + n_s)/T_{SRS} \rfloor$ may be expressed. $N_{SRS\_symbol}$ is the configured number of SRS symbols in the configured SRS slot. In the case of an aperiodic SRS, since only configuration in one slot may be necessary, $n_{SRS}=\lfloor l'/r \rfloor$ may be expressed.

Proposal 2-4-1

The UE located at the cell edge may perform UL full-band transmission in multiple symbols configured to acquire SRS receive power. In this case, sequence parameters, precoding vectors mapped to the SRS resources, and ports may be equally applied.

Proposal 2-5

It is possible to support SRS hopping through a single hopping configuration integrating intra-slot configuration and/or inter-slot hopping configuration. At this time, the parameters may be as follows.

When information on the parameters for the single hopping configuration includes SRS resource position information: The information on the parameters for the single hopping configuration may include information on a value indicating the SRS resource allocation position in each symbol starting from a hopping enable symbol (e.g., RIV, RE/RB index, subband index, and partial band index), the number of configured SRS symbols in the SRS transmission slot and index, the intra-slot hopping cycle, the inter-slot hopping cycle, a hopping enable flag indicating whether hopping is enabled, etc.

When the hopping pattern is used, the information on the parameters for the single hopping configuration may include the number of configured SRS symbols in the SRS transmission slot and the index, the symbol-level hopping cycle, the slot-level hopping cycle, the intra-slot and/or inter-slot hopping pattern, the hopping enable flag, etc.

Figure 25:
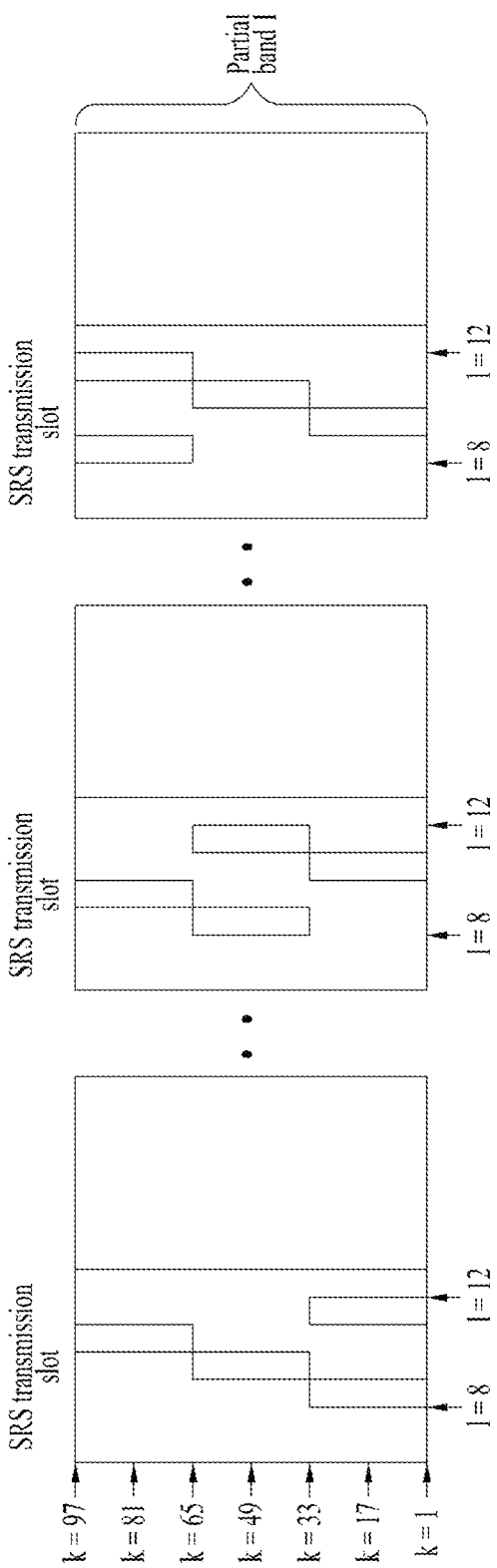
FIG. 25 is a diagram illustrating a hopping pattern according to the number of symbols of an SRS.

FIG. 25 is a diagram illustrating a hopping pattern according to the number of SRS symbols.

As an embodiment, the case of using the hopping pattern will be described.

Example of (dedicated) RRC signaling for frequency hopping configuration (Dedicated) RRC signaling for frequency hopping configuration may include the SRS BW=32 RBs, the number of configured SRS symbols in the SRS transmission slot ($N_{SRS\_symbol}$)=4, the start symbol position (or the index) of the configured SRS=8, the end symbol position (or the index) of the configured SRS=11, the partial band index=1, the symbol hopping cycle $T_{symbol\_hopping}$=3 symbols, and the slot hopping cycle $T_{slot\_hopping}$=$T_{SRS}$ slots. When $n_{SRS}$=⌊(l'+$N_{SRS\_symbol}$×⌊($n_f$×$N_s$+$n_s$)/$T_{SRS}$⌋)$T_{symbol\_hopping}$⌋ is configured (here, $n_{SRS}$ is a hopping interval in the time domain), as shown in FIG. 25, the hopping pattern may not be changed according to SRS slot but may be formed according to the number of the SRS symbols.

Figure 26:
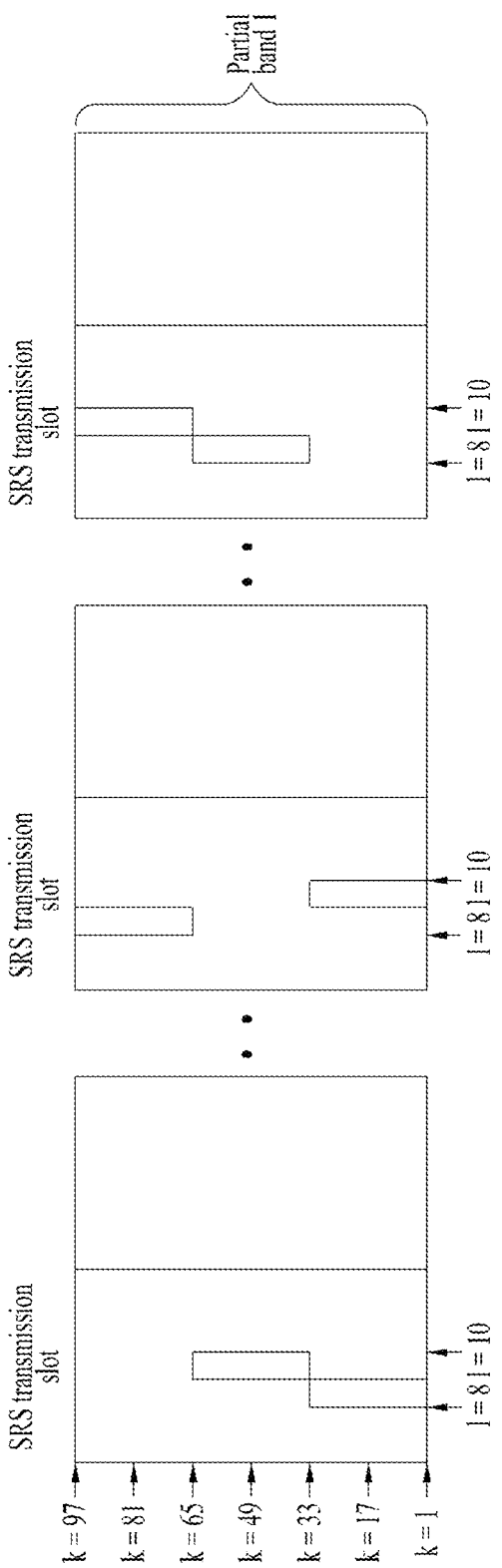
FIG. 26 is a diagram illustrating a hopping pattern according to the number of symbols of an SRS (when the number of symbols of the SRS in an SRS slot is less than a symbol hopping cycle)

FIG. 26 is a diagram illustrating a hopping pattern according to the number of SRS symbols (when the number of symbols of the SRS in an SRS slot is less than a symbol hopping cycle).

As another embodiment, the case of using the hopping pattern will be described. In the example of FIG. 25, hopping is easily applicable even when the number of symbols in one SRS slot is less than the symbol hopping cycle.

Example of (dedicated) RRC for frequency hopping configuration (Dedicated) RRC signaling for frequency hopping configuration may include information on system bandwidth (SRS BW=32 RBs), the number of configured SRS symbols in the SRS transmission slot ($N_{SRS\_symbol}$)=2, the start symbol position (or the index) of the configured SRS=8, the end symbol position (or the index) of the configured SRS=9, the partial band index=1, the symbol hopping cycle $T_{symbol\_hopping}$=3 symbols, and the slot hopping cycle $T_{slot\_hopping}$=2$T_{SRS}$ slots. The hopping interval in the time domain $n_{SRS}$ may be configured as $n_{SRS}$=⌊(l'+$N_{SRS\_symbol}$×⌊($n_f$×$N_s$+$n_s$)/$T_{SRS}$⌋)$T_{symbol\_hopping}$⌋.

Proposal 3

If symbol-level hopping is configured in the periodic/aperiodic/semipersistent SRS, RRC configuration of the hopping pattern parameter and DCI configuration of the SRS resource position information may be performed by one of the following operations in order to support hopping between the partial bands.

The symbol-level hopping pattern parameters including the partial band index may be configured/transmitted through RRC signaling. The BS may configure/transmit the partial band index through DCI whenever multiple SRS symbols are transmitted and configure/transmit symbol-level hopping pattern parameters through RRC signaling. The partial band index may be replaced with other information indicating the frequency position for designating the partial band (e.g., RIV indicating the partial band position and range, partial band start RE/RB, and end RE/RB).

Figure 27:
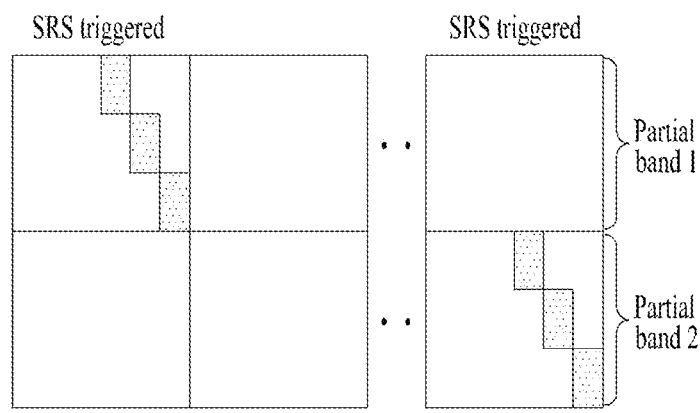
FIG. 27 is a diagram illustrating description of Case 1-1.

FIG. 27 is a diagram illustrating description of Case 1-1.

Case 1: A hopping pattern between SRS symbols is applied in one partial band and hopping to another partial band is performed in a next SRS triggered slot. As Case 1-1, as shown in FIG. 27, the hopping pattern between symbols in the next SRS triggered slot may be equal to the previous hopping pattern.

As an embodiment, the symbol-level hopping pattern configuration including the partial band index will be described.

In NR, when the number of slots in one frame $n_f$ is $N_s$, the index of each slot is $n_s$, and l' is the symbol index of the configured SRS, $n_{SRS}$ for hopping may be configured as shown in Equation 4 below.

$$n_{SRS} = l', \; k_0^{(p)} = \overline{k}_0^{(p)} + F(i_{pb}, n_f, n_s, T_{SRS}) + \sum_{b=0}^{B_{SRS}} {}'K_{TC}M_{sc,b}^{RS}n_b, \quad \text{Equation 4}$$

where, F($i_{pb}$,$n_f$,$n_s$,$T_{SRS}$) is a hopping position function according to the partial band index $i_{pb}$. $B_{SRS}$ spans on one partial band. F($i_{pb}$,$n_f$,$n_s$,$T_{SRS}$)=($i_{pb}$($n_f$,$n_s$,$T_{SRS}$)−1)×$BW_{pb}$. $BW_{pb}$ is the number of REs indicating the bandwidth of the partial band. $i_{pb}$($n_f$,$n_s$,$T_{SRS}$)=c($n_f$,$n_s$,$T_{SRS}$) mod $I_{pb}$. $I_{pb}$ is a total number of partial bands. c( ) is a scrambling function.

As another embodiment, transmission of the partial band index by the BS through DCI and the symbol-level hopping pattern will be described.

In Equation 4 above, $i_{pb}$ is transmitted by the BS through DCI in each slot, in which the SRS is transmitted, and the F($i_{pb}$,$n_f$,$n_s$,$T_{SRS}$) value is configured using $i_{pb}$.

Figure 28:
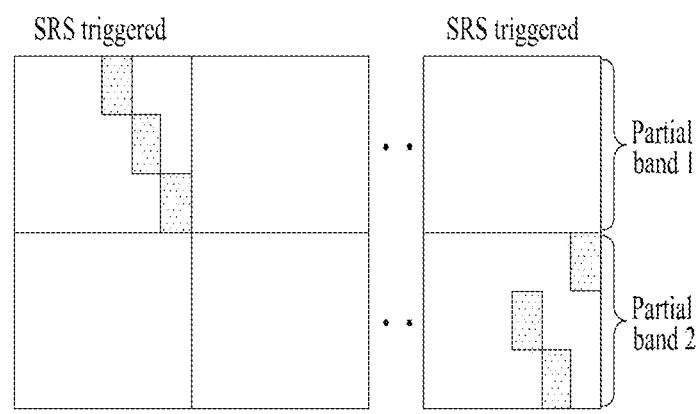
FIG. 28 is a diagram illustrating description of Case 1-2.

FIG. 28 is a diagram illustrating description of Case 1-2.

Case 1-2: The information on the hopping pattern may include a value indicating the partial band index or the partial band (RB and/or RE of the partial band), and the BS may configure the information on the hopping pattern in a UE-specific manner. As an embodiment, the symbol-level hopping pattern configuration including the partial band index of FIG. 28 may be expressed as shown in Equation 5 below.

$$n_{SRS} = l' + N_{SRS\_symbol} \times \lfloor (n_f \times N_s + n_s)/T_{SRS} \rfloor, \quad \text{Equation 5}$$

$$k_0^{(p)} = \overline{k}_0^{(p)} + F(i_{pb}, n_f, n_s, T_{SRS}) + \sum_{b=0}^{B_{SRS}} {}'K_{TC}M_{sc,b}^{RS}n_b,$$

where, $B_{SRS}$ spans on one partial band.

The following may be considered in consideration of a repetition symbol.

$$n_{SRS} = \lfloor l'/r \rfloor + N_{SRS\_symbol}/r \times \lfloor (n_f \times N_s + n_s)/T_{SRS} \rfloor,$$

$$k_0^{(p)} = \bar{k}_0^{(p)} + F(i_{pb}, n_f, n_s, T_{SRS}) + \sum_{b=0}^{B_{SRS}} {}'K_{TC} M_{sc,b}^{RS} n_b$$

Figure 29:
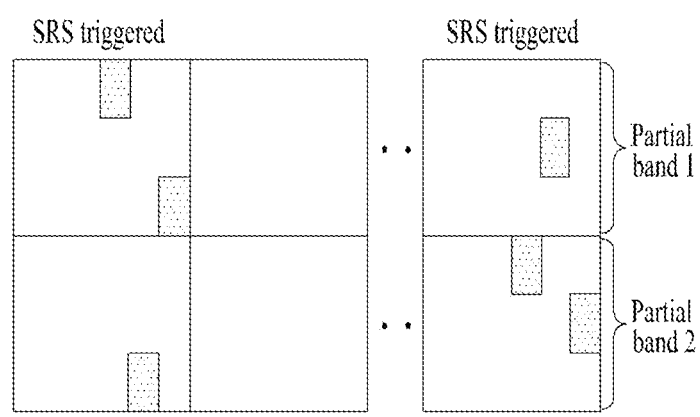
FIG. 29 is a diagram illustrating description of Case 2.

FIG. 29 is a diagram illustrating description of Case 2.

As Case 2, as shown in FIG. 29, the hopping pattern irrelevant to the partial band in the slot in which multiple SRS symbols are configured is applicable.

As an embodiment, an example of the hopping pattern irrelevant to the partial band in the slot in which multiple SRS symbols are configured may be expressed as shown in Equation 6 below.

$$n_{SRS} = l' + N_{SRS\_symbol} \times \lfloor (n_f \times N_s + n_s)/T_{SRS} \rfloor, \quad \text{Equation 6}$$
$$n_b = \{n_b + F_b(n_{SRS})\} \bmod N_b$$

where, $B_{SRS}$ spans full UL BW.

The following may be considered in consideration of a repetition symbol.

$$n_{SRS} = \lfloor l'/r \rfloor + N_{SRS\_symbol}/r \times \lfloor (n_f \times N_s + n_s)/T_{SRS} \rfloor, n_b = \{n_b + F_b(n_{SRS})\} \bmod N_b$$

Figure 30A:
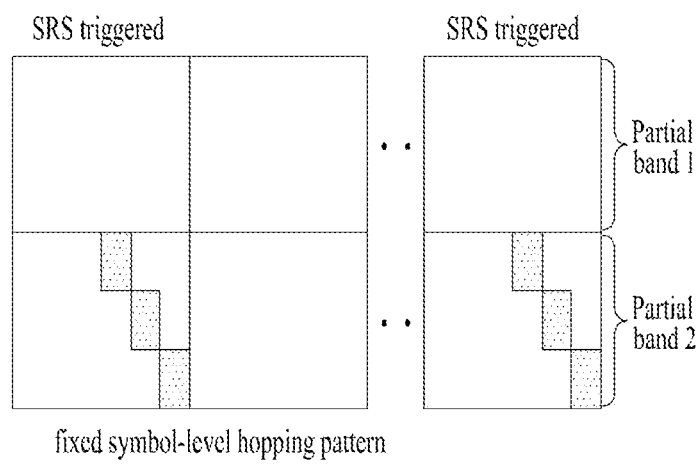
FIGS. 30A and 30B are diagrams illustrating description of Case 3.
Figure 30B:
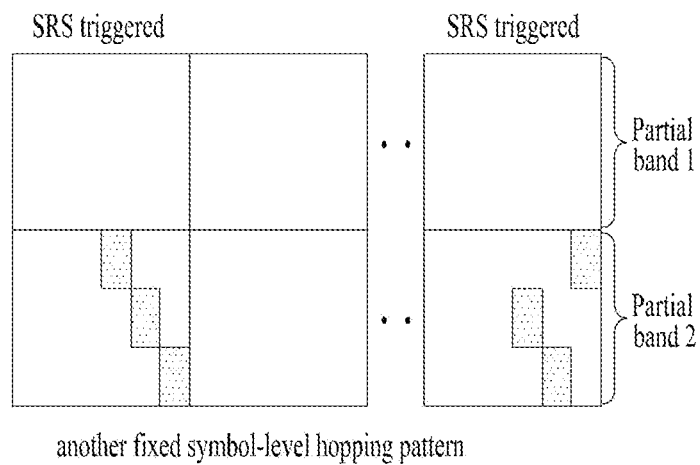

FIGS. 30A and 30B are diagrams illustrating description of Case 3.

As Case 3, frequency hopping between the partial bands may be disallowed. FIG. 30A shows a fixed intra-slot hopping pattern and FIG. 30B shows another inter-slot hopping pattern. $B_{SRS}$ may be configured to span the partial band.

Proposal 4

A method of transmitting information on parameters for inter-slot frequency hopping configuration supporting hopping between partial bands in a periodic/aperiodic/semipersistent SRS is proposed.

Proposal 4-1

The BS may configure/transmit information on the SRS frequency resource position, the number of the SRS symbols in SRS-triggered slot, the SRS symbol position, and the position of the transmitted partial band to the UE through RRC signaling (e.g., UE dedicated RRC signaling).

Figure 31:
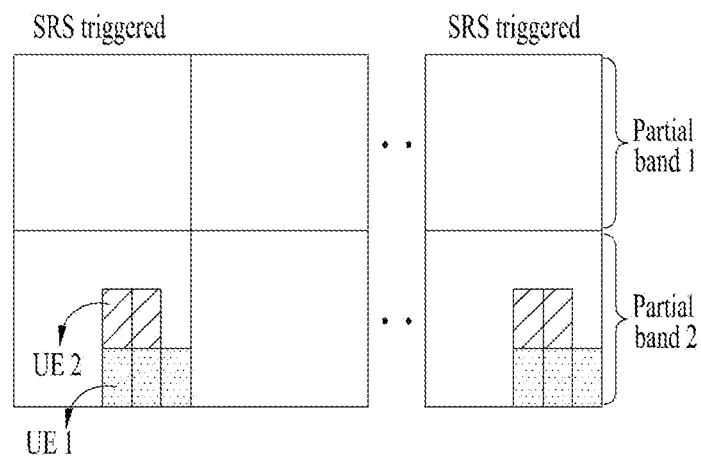
FIG. 31 is a diagram illustrating configuration of a fixed SRS resource position at the time of periodic/aperiodic SRS transmission.

FIG. 31 is a diagram illustrating configuration of a fixed SRS resource position at the time of periodic/aperiodic SRS transmission.

The structure of FIG. 31 is possible when only inter-slot hopping in a specific partial band is supported and can improve SRS reception performance through energy combining of the continuously concatenated SRS symbols.

Proposal 4-2

The BS may configure/transmit information on the SRS frequency resource position, the number of the SRS symbols in the SRS-triggered slot, and the SRS symbol position through RRC signaling (e.g., UE dedicated RRC signaling) and configure/transmit the transmitted partial band position through DCI.

Proposal 4-3

The BS may configure/transmit information on the SRS frequency resource position, the number of the SRS symbols in the SRS-triggered slot, and the SRS symbol position through RRC signaling (e.g., UE dedicated RRC signaling) and configure the transmitted partial band position using the inter-slot hopping pattern.

Figure 32:
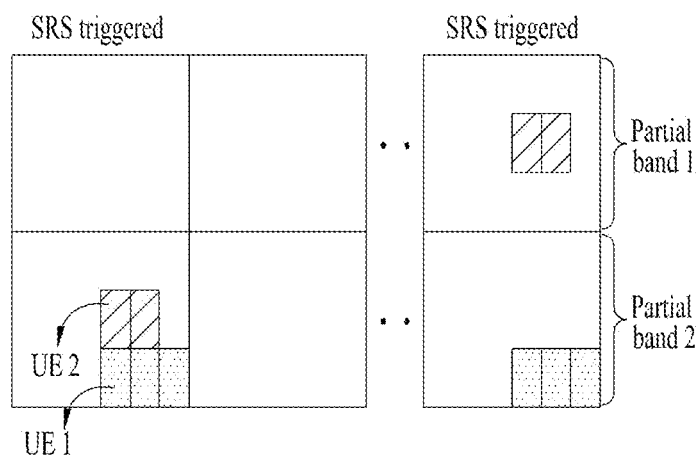
FIG. 32 is a diagram illustrating configuration of hopping between partial bands at the time of periodic/aperiodic triggering.

FIG. 32 is a diagram illustrating configuration of hopping between partial bands at the time of periodic/aperiodic triggering.

As shown in FIG. 32, the partial band position may be dynamically changed. As an embodiment, an example of the inter-slot hopping pattern (an example of hopping between partial bands) may be expressed as shown in Equation 7 below.

$$n_{SRS} = \lfloor N_{SRS\_symbol} \times \lfloor (n_f \times N_s + n_s)/T_{SRS} \rfloor \rfloor, i_{pb}(n_{SRS}) = c(n_{SRS}) \bmod I_{pb} \quad \text{Equation 7}$$

In consideration of a repetition symbol, $n_{SRS} = \lfloor N_{SRS\_smybol}/r \times \lfloor (n_f \times N_s + n_s)/T_{SRS} \rfloor \rfloor$, $i_{pb}(n_{SRS}) = c(n_{SRS}) \bmod I_{pb}$ may be expressed.

Proposal 4-4

The BS may configure/transmit information on the SRS frequency resource position through (dedicated) RRC signaling and configure/transmit information on the number of SRS symbols and the partial band position through DCI.

Proposal 4-5

The BS may configure/transmit information on the SRS frequency resource position through (dedicated) RRC signaling and configure information on the number of SRS symbols and the partial band position using the inter-slot hopping pattern.

Figure 33:
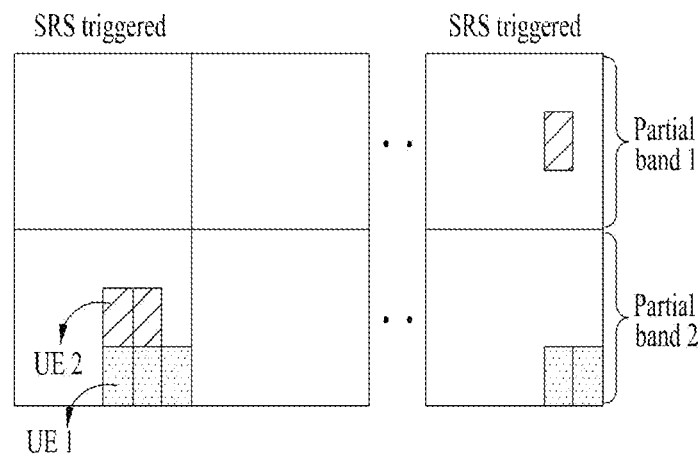
FIG. 33 is a diagram illustrating configuration of hopping between partial bands at the time of periodic/aperiodic triggering.

FIG. 33 is a diagram illustrating configuration of hopping between partial bands at the time of periodic/aperiodic triggering.

As shown in FIG. 33, a structure for flexibly supporting partial band hopping at the time of SRS transmission and configuring the number of SRS symbols in the inter-slot hopping parameter configuration may be considered.

Proposal 4-6

The BS configures/transmits information on the number of SRS symbols and the partial band position through (dedicated) RRC signaling and configures/transmits information on the SRS frequency resource position (e.g., RIV) through DCI.

Proposal 4-7

The BS may configure/transmit information on the number of SRS symbols and the partial band position through (dedicated) RRC signaling and configure information on the SRS frequency resource position using the inter-slot hopping pattern.

Figure 34:
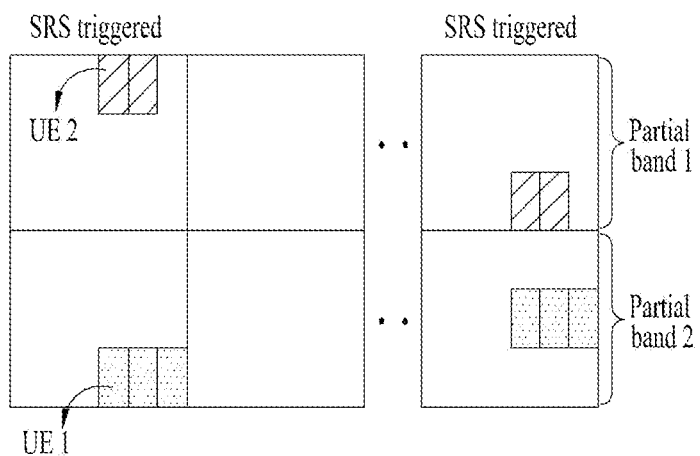
FIG. 34 is a diagram illustrating an example of changing an SRS resource position at the time of periodic/aperiodic triggering (a partial band is fixed)

FIG. 34 is a diagram illustrating an example of changing an SRS resource position at the time of periodic/aperiodic triggering (a partial band is fixed). As shown in FIG. 34, a structure for prohibiting hopping between partial bands but allowing inter-slot hopping in one partial band is also possible.

Proposal 4-8

The BS configures/transmits information on the number of SRS symbols through (dedicated) RRC signaling and configures/transmits information on the partial band position and the SRS frequency resource position (e.g., RIV) through DCI.

Proposal 4-9

The BS configures/transmits information on the number of SRS symbols through (dedicated) RRC signaling and configures information on the partial band position using the inter-slot hopping pattern. The BS configures/transmits information on the SRS frequency resource position (e.g., RIV) through DCI.

Proposal 4-10

The BS configures/transmits information on the number of SRS symbols through (dedicated) RRC signaling and configures information on the partial band position and the SRS frequency resource position (e.g., RIV) using the inter-slot hopping pattern.

Figure 35:
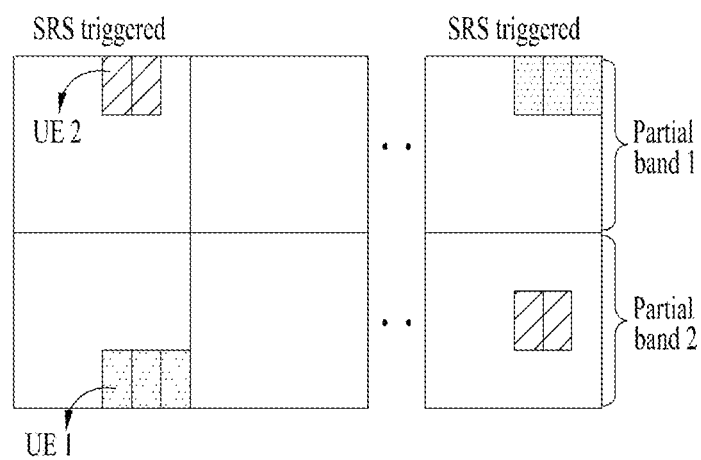
FIG. 35 is a diagram illustrating an example of changing an SRS resource position at the time of periodic/aperiodic triggering (a partial band is variable)

FIG. 35 is a diagram illustrating an example of changing an SRS resource position at the time of periodic/aperiodic triggering (a partial band is variable).

FIG. 35 shows a configuration for allowing partial band hopping between SRS slots while the number of SRS symbols in the slot between UEs is fixed (that is, the number of energy combining symbols is fixed according to a received signal difference according to a distance between the UE and the BS).

Proposal 5

For UL resource allocation of the UL full band or UL SRS partial band of the UEs each having a narrow band RF, a predetermined number of symbols (n symbols) of the configured SRS symbols is emptied to apply a retuning time at the time of intra-slot hopping. However, n is less than the number L' of symbols of the configured SRS. Since the n value may be determined according to retuning delay of the UEs each having a narrow band RF, the UEs each having the narrow band RF may report the retuning delay value to the BS. The BS may indicate to the UE how many SRS symbols are emptied at which position in all the SRS symbols, based on the report.

Proposal 5-1

The BS may configure/transmit information on the position of the empty symbol in the configured SRS slot through cell-specific RRC signaling.

The BS may collectively empty the specific SRS symbol without the RF capability report from the UEs and the emptied symbols may be used for other UL channels. Accordingly, symbol-level hopping may be basically configured to be performed in the localized resource SRS at the emptied symbol boundary.

Proposal 5-2

The BS may configure/transmit the position of the empty symbol in the configured SRS slot through UE-dedicated RRC signaling.

Proposal 5-3

The BS may start emptying at an emptying start position $l_0'$ within the symbol l'≤L' configured for the position of the empty symbol in the configured SRS slot and transmit the symbol index $l_1'$ for transmission of the SRS symbol to the UE again. At this time, a relationship of $l_0' \le l_1' \le L'$ is satisfied.

Proposal 5-4

The RF capability (the transmission RF degree covering the full or partial UL band and/or the RF retuning degree) of the UE may be reported to the BS. The BS may transmit the position of empty symbols, the number of empty symbols, and the number of configured SRS symbols to the UE through RRC, MAC-CE or DCI in a UE-specific manner according to the intra-slot hopping pattern when multi-SRS symbols are triggered (periodic/aperiodic/semipersistent).

Figures 36A, 36B:
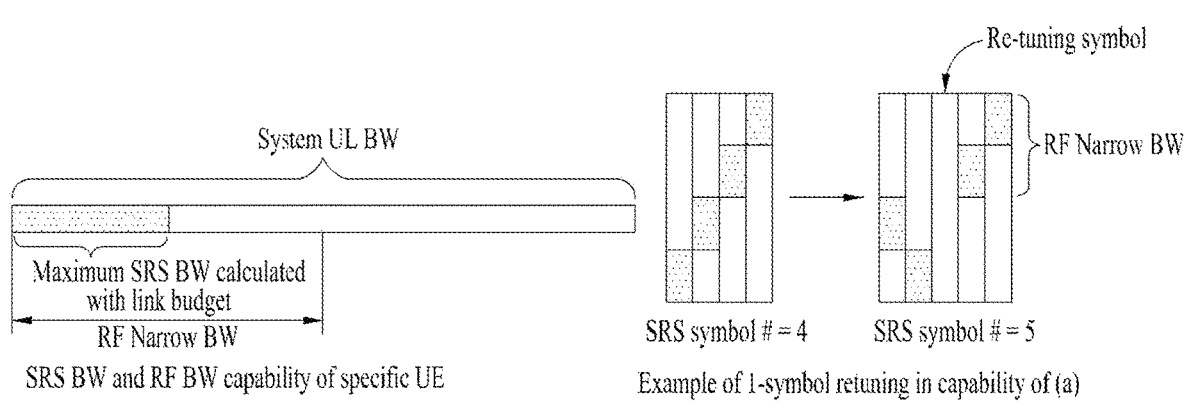
FIGS. 36A and 36B are diagrams illustrating a symbol-level hopping pattern considering RF retuning of a UE having narrow band RF capability.

FIGS. 36A and 36B are diagrams illustrating an intra-slot hopping pattern considering RF retuning of a UE having narrow band RF capability.

FIG. 36A shows the SRS BW and RF BW capability of a specific UE and FIG. 36B shows 1-symbol retuning in the capability of FIG. 36A.

The present disclosure proposes a configuration and method for enabling UEs (e.g., cell-edge UEs), which cannot perform UL full-band transmission due to limitation of UE's link budget, to perform UL full-band sounding while subband sounding hops on multiple symbols or multiple slots if UL full-band sounding is requested at the time of NR SRS transmission. Such an SRS hopping configuration and method may be used not only for UL resource allocation but also for UL beam management. The present disclosure proposes an SRS hopping configuration method considering RF retuning in order to support hopping of NR UEs having narrow band RF capability.

Proposal 6 (SRS counter related to SRS transmission)

$B_{SRS}$ may have a value of {0, 1, 2, 3} as a parameter indicating SRS bandwidth and $b_{hop}$ may have a value of {0, 1, 2, 3} as a parameter indicating SRS frequency hopping bandwidth. The BS may transmit the values of (or information on) $B_{SRS}$ and $b_{hop}$ to the UE through RRC signaling. r denotes the repetition number of symbol(s) configured for SRS transmission and r=1, 2, or 4. The BS may transmit the value of r to the UE through RRC signaling.

An SRS transmission timing equation for applying intra-slot hopping to repetition symbol configuration in one slot may be represented as in Equation 8 below in which $n_{SRS}$ denotes an SRS counter related to SRS transmission.

$$n_{SRS} = \lfloor l'/r + N_{symbol}/r \times \lfloor (n_f \times N_s + n_s)/T_{SRS} \rfloor \rfloor \quad \text{Equation 8}$$

where $N_{symbol}$ denotes the number of SRS symbols configured in one slot. $N_s$ denotes the number of slots in one radio frame. l' denotes a symbol index {0, . . . , $N_{symbol}$−1} for which an SRS is configured. $n_f$ denotes a radio frame index, and $n_s$ denotes a slot index in one radio frame. $T_{SRS}$ denotes a UE-specific SRS transmission cycle and r denotes the repetition number of SRS symbols in a slot.

According to configuration of the repetition number r of symbols, on/off of intra-slot hopping or on/off of a repetition symbol may be determined.

Case of r=1

When r=1, intra-slot hopping or inter-slot hopping may be operated or performed according to the relationship between $B_{SRS}$ (parameter indicating SRS bandwidth) and $b_{hop}$ (parameter indicating SRS frequency hopping bandwidth) (if $B_{SRS} \le b_{hop}$, frequency hopping may not be enabled and, if $B_{SRS} > b_{hop}$, frequency hopping may be enabled).

Case of r=2

When r=2, whether to perform intra-slot hopping or inter-slot hopping may be determined according to the number of SRS symbols allocated to a corresponding slot. When $N_{symbol}$ is 2, intra-slot hopping becomes off. When $N_{symbol}$ is 4, intra-slot hopping may be performed in a group of two symbols.

Case of r=4

When r=4 and $N_{symbol}$ is 4, intra-slot hopping becomes off and inter-slot hopping may become on or off according to the relationship between $B_{SRS}$ and $b_{hop}$. When r=4 and $N_{symbol}$ is 2, since r>$N_{symbol}$, SRS configuration may be interpreted as being modified. That is, although the UE receives information on r=4 from the BS, the UE may interpret the relationship of r>$N_{symbol}$ as r=2. Accordingly, intra-slot hopping becomes off and inter-slot hopping may become on or off according to the relationship between $B_{SRS}$ and $b_{hop}$. For example, when $B_{SRS} \le b_{hop}$, inter-slot hopping may not be enabled (i.e., off) and, when $B_{SRS} > b_{hop}$, inter-slot hopping may be enabled (i.e., on).

When $N_{symbol}$ is 2, although r>$N_{symbol}$, r=4 may mean the repetition number of symbols over a slot. In this case, although intra-slot hopping becomes off, inter-slot hopping may become on or off according to the relationship between $B_{SRS}$ and $b_{hop}$ in units of a specific slot group (the repetition number of slots is greater than 2). For example, when $B_{SRS} \le b_{hop}$, inter-slot hopping may not be enabled (i.e., off) and, when $B_{SRS} > b_{hop}$, inter-slot hopping may be enabled (i.e., on).

Case of r>4

When r>4, since the relationship of r>$N_{symbol}$ is always satisfied (because $N_{symbol}$ is any one of 1, 2, and 4), configuration needs to be interpreted as being modified.

When $N_{symbol}$=2, although the UE receives information of r=4 from the BS, the UE needs to interpret the received information as r=2. Accordingly, intra-slot hopping may become off and inter-slot hopping may become on or off according to the relationship between $B_{SRS}$ and $b_{hop}$. For example, when $B_{SRS} \leq b_{hop}$, inter-slot hopping may not be enabled (i.e., off) and, when $B_{SRS} > b_{hop}$, inter-slot hopping may be enabled (i.e., on).

When r>4 and $N_{symbol}$=2, the UE may interpret the repetition number of symbols over a slot as being greater than 4. Accordingly, although intra-slot hopping becomes off, inter-slot hopping may be on or off according to the relationship between $B_{SRS}$ and $b_{hop}$ in units of a specific slot group (the repetition number of slots (slots in which an SRS is repeatedly transmitted) is greater than 2). For example, when $B_{SRS} \leq b_{hop}$, inter-slot hopping may not be enabled (i.e., off) and, when $B_{SRS} > b_{hop}$, inter-slot hopping may be enabled (i.e., on).

Procedure of transmitting SRS by UE in relation to Proposal 6

Figure 37:
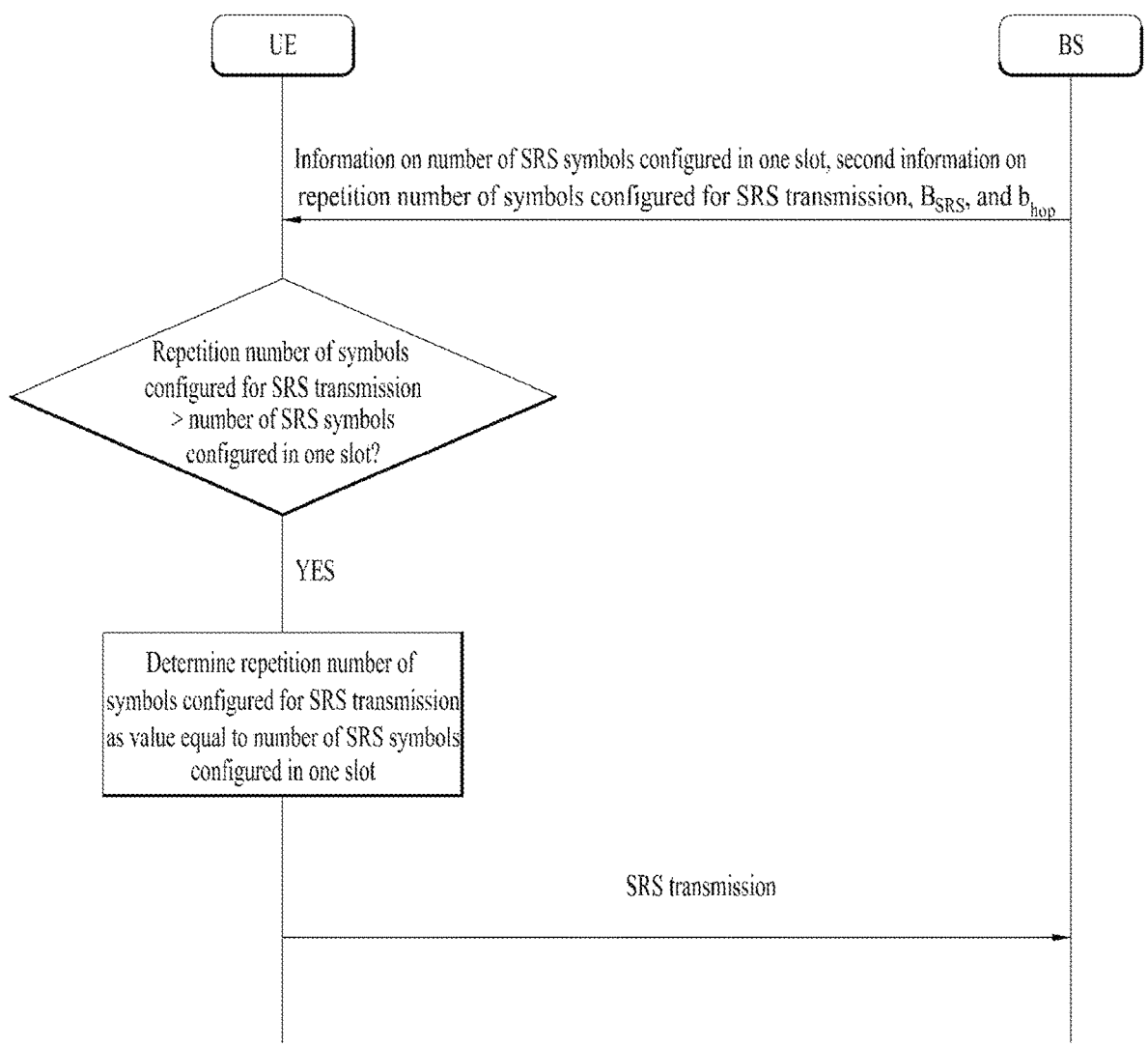
FIG. 37 is a diagram illustrating a procedure of transmitting an SRS by a UE in relation to Proposal 6.

FIG. 37 is a diagram illustrating a procedure of transmitting an SRS by a UE in relation to Proposal 6.

Referring to FIG. 37, the UE may receive first information on the number of SRS symbols configured in one slot and second information on the repetition number of symbols configured for SRS transmission from the BS. The UE may determine whether the repetition number of symbols configured for SRS transmission is greater than the number of SRS symbols configured in one slot. If the repetition number of symbols configured for SRS transmission is greater than the number of SRS symbols configured in one slot, the UE may determine the repetition number of symbols configured for SRS transmission as a value equal to the number of SRS symbols configured in one slot. The UE may transmit the SRS based on the determined repetition number of symbols configured for SRS transmission.

The UE may further receive information on a first parameter value $B_{SRS}$ indicating SRS bandwidth and information on a second parameter value $b_{hop}$ indicating SRS frequency hopping bandwidth from the BS. If the first parameter value is greater than the second parameter value, the UE may transmit the SRS by (frequency-)hopping the SRS at a slot level.

If the determined repetition number of symbols configured for SRS transmission is a repetition number over at least two slots, the UE may transmit the SRS over at least two slots. Unlike this case, if the determined repetition number of symbols configured for SRS transmission is a repetition number over one slot, the UE may transmit the SRS over one slot without performing frequency hopping. The UE may receive the first information, the second information, the information on the first parameter value $B_{SRS}$, and the information on the second parameter value $b_{hop}$, in FIG. 37, through RRC signaling.

Procedure of receiving SRS by BS in relation to Proposal 6

Figure 38:
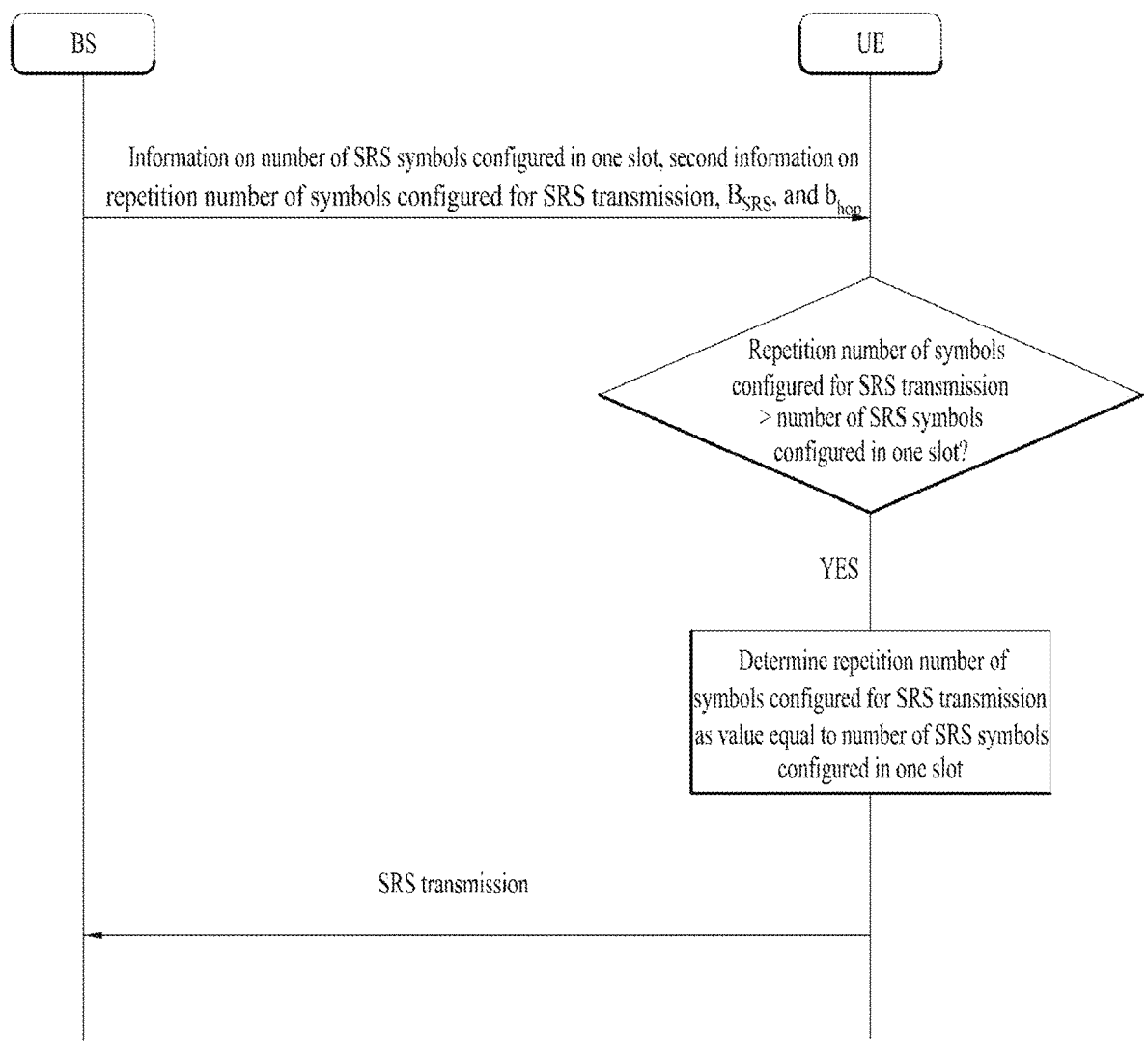
FIG. 38 is a diagram illustrating a procedure of receiving an SRS by a BS in relation to Proposal 6.

FIG. 38 is a diagram illustrating a procedure of receiving an SRS by a BS in relation to Proposal 6.

Referring to FIG. 38, the BS may transmit first information on the number of SRS symbols configured in one slot and second information on the repetition number of symbols configured for SRS transmission to the UE. If the repetition number of symbols configured for SRS transmission is greater than the number of SRS symbols configured in one slot, the BS may determine (or recognize) the repetition number of symbols configured for SRS transmission as a value equal to the number of SRS symbols configured in one slot. The BS may receive the SRS based on the determined repetition number of symbols configured for SRS transmission.

The BS may transmit information on a first parameter value $B_{SRS}$ indicating SRS bandwidth and information on a second parameter value $b_{hop}$ indicating SRS frequency hopping bandwidth to the UE. If the first parameter value is greater than the second parameter value, the BS may receive the SRS which is frequency-hopped at a slot level. If the determined repetition number of symbols configured for SRS transmission is a repetition number over at least two slots, the BS may receive the SRS over at least two slots. Unlike this case, if the determined repetition number of symbols configured for SRS transmission is a repetition number over one slot, the BS may receive the SRS over one slot in the form of not being frequency-hopped. The BS may transmit the first information, the second information, the information on the first parameter value $B_{SRS}$, and the information on the second parameter value $b_{hop}$ to the UE through RRC signaling.

Figure 39:
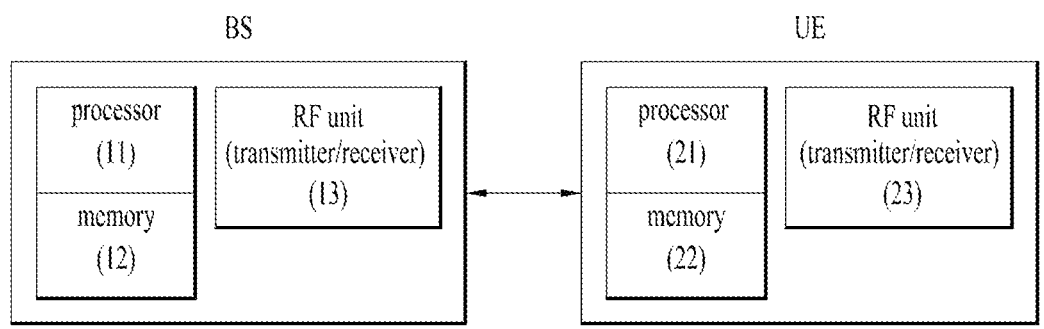
FIG. 39 is a block diagram of a UE for transmitting an SRS and a BS for receiving an SRS in relation to Proposal 6.

FIG. 39 is a block diagram of a UE for transmitting an SRS and a BS for receiving an SRS in relation to Proposal 6.

UE for transmitting SRS in relation to Proposal 6

Referring to FIG. 38, a receiver 23 of the UE may receive first information on the number of SRS symbols configured in one slot and second information on the repetition number of symbols configured for SRS transmission from the BS. A processor 21 of the UE may determine whether the repetition number of symbols configured for SRS transmission is greater than the number of SRS symbols configured in one slot. If the repetition number of symbols configured for SRS transmission is greater than the number of SRS symbols configured in one slot, the processor 21 may determine the repetition number of symbols configured for SRS transmission as a value equal to the number of SRS symbols configured in one slot. A transmitter 23 of the UE may transmit the SRS based on the determined repetition number of symbols configured for SRS transmission. The receiver 23 of the UE may receive information on a first parameter value $B_{SRS}$ indicating SRS bandwidth and information on a second parameter value $b_{hop}$ indicating SRS frequency hopping bandwidth from the BS. If the first parameter value is greater than the second parameter value, the processor 21 of the UE may control the transmitter 23 to transmit the SRS by hopping the SRS at a slot level. The receiver 23 of the UE may receive the first information, the second information, the information on the first parameter value $B_{SRS}$, and the information on the second parameter value $b_{hop}$ from the BS through RRC signaling.

BS for Receiving SRS in Relation to Proposal 6

A transmitter 13 of the BS may transmit first information on the number of SRS symbols configured in one slot and second information on the repetition number of symbols configured for SRS transmission to the UE. If the repetition number of symbols configured for SRS transmission is greater than the number of SRS symbols configured in one slot, a processor 11 of the BS may determine or recognize the repetition number of symbols configured for SRS transmission as a value equal to the number of SRS symbols configured in one slot. A receiver 13 of the BS may receive the SRS based on the determined repetition number of symbols configured for SRS transmission. The transmitter 13 of the BS may transmit information on a first parameter value indicating SRS bandwidth and information on a second parameter value indicating SRS frequency hopping bandwidth to the UE. If the first parameter value is greater than the second parameter value, the receiver 13 of the BS may receive the SRS in the form of being (frequency-) hopped at a slot level.

If the determined repetition number of symbols configured for SRS transmission is a repetition number over at least two slots, the receiver 13 of the BS may receive the SRS over at least two slots. Unlike this case, if the determined repetition number of symbols configured for SRS transmission is a repetition number over one slot, the receiver 13 of the BS may receive the SRS over one slot in the formed of not being frequency-hopped. The transmitter 13 of the BS may transmit the first information, the second information, the information on the first parameter value $B_{SRS}$, and the information on the second parameter value $b_{hop}$ to the UE through RRC signaling.

Definition of Repetition Number of Slots

As another embodiment, the repetition number of slots may be defined. The repetition number of slots means the number of slots in which repetition for SRS transmission is performed. Accordingly, intra-slot hopping, inter-slot hopping, symbol-level repetition, or slot-level repetition may be performed by a combination of the repetition number R of slots and the repetition number r of symbols. Equation 9 below indicates $n_{SRS}$ considering the repetition number R of slots.

$$n_{SRS}=\lfloor l'/r \rfloor + N_{symbol}/r \times \lfloor (n_f \times N_s + n_s)/(R \times T_{SRS}) \rfloor \quad \text{Equation 9}$$

where $N_{symbol}$ denotes the number of SRS symbols configured in one slot. $N_s$ denotes the number of slots in one radio frame. l' denotes a symbol index $\{0, \ldots, N_{symbol}-1\}$ configured for SRS transmission. $n_f$ denotes a radio frame index, and $n_s$ denotes a slot index in one radio frame. $T_{SRS}$ denotes a UE-specific SRS transmission cycle and r denotes the repetition number of SRS symbols in a slot. R denotes the number of slots in which repetition for SRS transmission is performed.

In this case, the value of r may be limited according to the number of symbols in a slot. When $N_{symbol}=4$, r may be $\{1,2,4\}$ and, when $N_{symbol}=2$, r may be $\{1,2\}$.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The method of transmitting and receiving an SRS and the communication apparatus therefor may be industrially applicable to various wireless communication systems such as a 3GPP LTE/LTE-A system and an NR (5G) communication system.

What is claimed is:

1. A method of transmitting a sounding reference signal (SRS) by a user equipment (UE), the method comprising:
   receiving, from a base station (BS), first information on (i) a number of SRS symbols configured in one slot and (ii) a repetition number of symbols configured for SRS transmission;
   receiving, from the BS, second information on (i) a first parameter value related to SRS bandwidth and (ii) a second parameter value related to SRS frequency hopping bandwidth; and
   transmitting the SRS based on the first information and the second information,
   wherein, based on the first parameter value being greater than the second parameter value, frequency hopping of the SRS is enabled.

2. The method of claim 1,
   wherein the repetition number of symbols configured for SRS transmission is R, and the number of SRS symbols configured in the one slot is N, and
   wherein whether the SRS is transmitted with intra-slot frequency hopping and whether the SRS is transmitted with inter-slot frequency hopping are determined based on values of the N and the R.

3. The method of claim 1,
   wherein the repetition number of symbols configured for SRS transmission is a repetition number over at least two slots, and
   wherein the SRS is transmitted over the at least two slots.

4. The method of claim 1,
   wherein the repetition number of symbols configured for SRS transmission is a repetition number over the one slot, and
   wherein the SRS is transmitted over the one slot without the frequency hopping.

5. The method of claim 1,
   wherein the SRS symbols are adjacent symbols,
   wherein the N is one of 1, 2, and 4, and the R is one of 1, 2, or 4.

6. A user equipment (UE) configured to transmit a sounding reference signal (SRS), the UE comprising:
   a receiver;
   a transmitter; and
   a processor,
   wherein the receiver is configured to receive, from a base station (BS), first information on (i) a number of SRS symbols configured in one slot and (ii) a repetition number of symbols configured for SRS transmission, and second information on (i) a first parameter value related to SRS bandwidth and (ii) a second parameter value related to SRS frequency hopping bandwidth,
   wherein the transmitter is configured to transmit the SRS based on the first information and the second information, and
   wherein, based on the first parameter value being greater than the second parameter value, frequency hopping of the SRS is enabled.

7. The UE of claim 6,
wherein the repetition number of symbols configured for SRS transmission is R, and the number of SRS symbols configured in the one slot is N, and
wherein whether the SRS is transmitted with intra-slot frequency hopping and whether the SRS is transmitted with inter-slot frequency hopping are determined based on values of the N and the R.

8. The UE of claim 6,
wherein the repetition number of symbols configured for SRS transmission is a repetition number over at least two slots, and
wherein the SRS is transmitted over the at least two slots.

9. The UE of claim 6,
wherein the repetition number of symbols configured for SRS transmission is a repetition number over the one slot, and
wherein the SRS is transmitted over the one slot without the frequency hopping.

10. The UE of claim 6,
wherein the SRS symbols are adjacent symbols,
wherein the N is one of 1, 2, and 4, and the R is one of 1, 2, or 4.

11. A non-transitory computer readable storage medium, wherein the non-transitory computer readable storage medium is configured to store at least one computer program including instructions for causing, when executed by at least one processor, the at least one processor to perform an operation for a user equipment, wherein the operation includes:
receiving, from a base station (BS), first information on (i) a number of SRS symbols configured in one slot and (ii) a repetition number of symbols configured for SRS transmission;
receiving, from the BS, second information on (i) a first parameter value related to SRS bandwidth and (ii) a second parameter value related to SRS frequency hopping bandwidth; and
transmitting the SRS based on the first information and the second information,
wherein, based on the first parameter value being greater than the second parameter value, frequency hopping of the SRS is enabled.

12. The non-transitory computer readable storage medium of claim 11,
wherein the repetition number of symbols configured for SRS transmission is R, and the number of SRS symbols configured in the one slot is N, and
wherein whether the SRS is transmitted with intra-slot frequency hopping and whether the SRS is transmitted with inter-slot frequency hopping are determined based on values of the N and the R.

13. The non-transitory computer readable storage medium of claim 11,
wherein the repetition number of symbols configured for SRS transmission is a repetition number over at least two slots, and
wherein the SRS is transmitted over the at least two slots.

14. The non-transitory computer readable storage medium of claim 11,
wherein the repetition number of symbols configured for SRS transmission is a repetition number over the one slot, and
wherein the SRS is transmitted over the one slot without the frequency hopping.

15. The non-transitory computer readable storage medium of claim 11,
wherein the SRS symbols are adjacent symbols,
wherein the N is one of 1, 2, and 4, and the R is one of 1, 2, or 4.

* * * * *